US009020487B2

(12) United States Patent
Brisebois et al.

(10) Patent No.: US 9,020,487 B2
(45) Date of Patent: Apr. 28, 2015

(54) OVER-THE-AIR CONTENT MANAGEMENT OF WIRELESS EQUIPMENT IN CONFINED-COVERAGE WIRELESS NETWORKS

(75) Inventors: Arthur Richard Brisebois, Cumming, GA (US); Juan Derrick Smith, Stone Mountain, GA (US)

(73) Assignees: AT&T Mobility II LLC, Atlanta, GA (US); AT&T Intellectual Property I, LP, Atlanta, GA (US)

( * ) Notice: Subject to any disclaimer, the term of this patent is extended or adjusted under 35 U.S.C. 154(b) by 670 days.

(21) Appl. No.: 12/904,238

(22) Filed: Oct. 14, 2010

(65) Prior Publication Data

US 2012/0094643 A1  Apr. 19, 2012

(51) Int. Cl.
*H04M 3/00* (2006.01)
*H04W 8/24* (2009.01)

(52) U.S. Cl.
CPC ..................................... *H04W 8/245* (2013.01)

(58) Field of Classification Search
USPC ............................. 455/419, 418; 717/168–173
See application file for complete search history.

(56) References Cited

U.S. PATENT DOCUMENTS

| 7,881,745 | B1* | 2/2011 | Rao et al. ........................ 455/551 |
| 2005/0039178 | A1* | 2/2005 | Marolia et al. ................. 717/168 |
| 2005/0124332 | A1* | 6/2005 | Clark et al. .................... 455/419 |
| 2005/0233693 | A1* | 10/2005 | Karaoguz et al. ............. 455/3.06 |
| 2008/0148268 | A1* | 6/2008 | Hirouchi ........................ 718/103 |
| 2009/0063193 | A1* | 3/2009 | Barton et al. ....................... 705/3 |
| 2009/0239510 | A1* | 9/2009 | Sennett et al. ............. 455/414.1 |
| 2009/0265542 | A1* | 10/2009 | Khetawat et al. ............. 713/151 |
| 2010/0087188 | A1* | 4/2010 | Griff et al. .................... 455/424 |
| 2010/0135201 | A1* | 6/2010 | Lewis et al. .................... 370/328 |
| 2010/0161794 | A1* | 6/2010 | Horn et al. ..................... 709/224 |
| 2010/0169750 | A1* | 7/2010 | Chew et al. .................... 714/807 |

\* cited by examiner

*Primary Examiner* — Gerald Johnson
(74) *Attorney, Agent, or Firm* — Amin, Turocy & Watson, LLP

(57) ABSTRACT

System(s), apparatus(es), and method(s) are provided for managing content of wireless equipment (WE) over-the-air (OTA). Content is germane to feature(s) of the WE and is related to operation thereof. Management of the content is automatically implemented in response to attachment of the WE to a confined-coverage access point (AP). The WE and a network server enable, in part, such management. The confined-coverage AP enables exchange of signaling and data associated with management of the content amongst the WE and the network server. Content includes software (SW); management OTA of SW can include update of an in-use version of a SW application or related SW component(s). SW update signaling can comprise message(s) conveying a WE identifier and in-use version(s) of SW; request(s) for an update instruction; request(s) for at least one file associated with the SW; message(s) indicative of availability of version(s) of SW newer than the in-use version(s).

20 Claims, 12 Drawing Sheets

OVER-THE-AIR CONTENT MANAGEMENT OF WIRELESS EQUIPMENT IN CONFINED-COVERAGE WIRELESS NETWORKS

TECHNICAL FIELD

The subject disclosure relates to telecommunication networks and, more particularly, to managing content of wireless equipment over-the-air (OTA) through operational resources of confined-coverage wireless networks and in response to operational behavior of confined-coverage access points. The content is specific to feature(s) of the wireless equipment and related to operation thereof.

BACKGROUND

Network operators and end-users benefit from operating wireless equipment (user equipment (UE), customer premises equipment (CPE), etc.) with current or last-know version software or firmware applications. Over-the-air (OTA) software updates, also referred to "fix" OTA (FOTA) updates, are relatively large and difficult or costly to deliver to wireless equipment (UE, CPE, etc.) over a macrocellular wireless data network. In FOTA updates, all or a substantive portion of data traffic including large FOTA files typically require costly transport between a base station and a network platform of a content provider. Such resources can be shared by a mixture of end-users consuming real-time and background applications in related user devices. Moreover, substantive background FOTA traffic tends to degrade the experience of real-time applications that share the same resources. Furthermore, macrocellular network coverage and related loading conditions also can reduce the success rate of delivery of large FOTA files to the wireless equipment. Because of at least the foregoing characteristics of FOTA software updates, such updates of wireless equipment are usually only implemented as required, e.g., when a subscriber that operates the wireless equipment calls customer service.

Additionally, certain conventional systems and related solutions that do not rely on OTA deployment of software (SW) application(s) or related component(s) in order to effect an SW update of a UE generally include considerable manual intervention and typically require tethering the UE to a host computer (e.g., a personal computer (PC)) with a broadband connection. Therefore, subscribers that exploit such conventional systems to update mobile devices are primarily limited to updates opportunities to the extent that they tether their mobile device to such host computer. Perhaps more importantly, subscriber without access to such host computer or opportunities to tether thereto on a regular basis are likely to consume wireless service through a UE that operates in underperforming conditions.

SUMMARY

The following presents a simplified summary of the subject disclosure in order to provide a basic understanding of some aspects thereof. This summary is not an extensive overview of the various embodiments of the subject disclosure. It is intended to neither identify key or critical elements of the subject disclosure nor delineate any scope thereof. The sole purpose of the subject summary is to present some concepts in a simplified form as a prelude to the more detailed description that is presented hereinafter.

One or more embodiments of the subject disclosure provide system(s), apparatus(es), and method(s) for managing content of wireless equipment (WE) over-the-air (OTA). Content is germane to at least one feature of the WE and is related to operation thereof; the at least one feature can be a hardware feature, a software feature, a security feature, an access clearance feature, a location feature, or a combination thereof. Management of the content is automatically implemented in response to attachment of the WE to a confined-coverage access point (AP). The WE and a network server enable, in part, such management. The confined-coverage AP enables exchange of signaling and data associated with management of the content amongst the WE and the network server. Content includes software (SW); management OTA of SW can include update of an in-use version of a SW application or related SW component(s). SW update signaling can comprise message(s) conveying a WE identifier and in-use version(s) of SW; request(s) for an update instruction; request(s) for at least one file associated with the SW; message(s) indicative of availability of version(s) of SW newer than the in-use version(s). The numerous aspects and features of the subject disclosure provide at least the following illustrative advantages with respect to conventional OTA update of SW application(s) or SW component(s) through macrocell base stations. (i) Automatic implementation of management content in response to recognition of a confined-coverage AP that serves the wireless equipment for which content in managed. (ii) Utilization of radio and transport resources provided by a subscriber of wireless service provided, in part, through the confined-coverage AP. (iii) Increased revenue potential and perceived quality of service originated in pro-active deployment (download, installation, activation, etc.) of content utilized by the wireless equipment. (iv) One-to-many distribution of content through caching. Compared to distribution of content that is common to multiple wireless equipment and entails repeated distribution from a network-based server (MOTA server 254) to each of the multiple wireless equipment, one-to-many distribution from a single non-network-based cache reduces utilization of backhaul network resources since the content can be made available to each of the multiple wireless equipment in a single event. (vi) Efficient release of resources of the confined-coverage AP and mitigation of impact of battery life of the wireless equipment. In addition, for at least a femtocell network, the numerous aspects or features described herein provide superior solution(s) to OTA management of content for wireless equipment by leveraging operational aspects of the femtocell network.

Aspects, features, or advantages of the subject disclosure are network and radio technology agnostic, and can be exploited in substantially any network and through most any or any wireless communication technology. For example, Wi-Fi (wireless fidelity), Worldwide Interoperability for Microwave Access (WiMAX); IS-95; Enhanced General Packet Radio Service (Enhanced GPRS); Third Generation Partnership Project (3GPP) Long Term Evolution (LTE); Third Generation Partnership Project 2 (3GPP2) Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA), or LTE Advanced. Additionally, substantially all or all aspects of the subject disclosure can include legacy telecommunication technologies.

While various aspects, features, or advantages of the subject disclosure are illustrated in reference to femtocell (femto) access point(s), such aspects and features also can be exploited in other types of confined-coverage access points (e.g., home-based access point(s), enterprise-based access point(s)) that provide wireless coverage to a confined wireless environment through substantially any or any disparate telecommunication technologies such as, but not limited to, Wi-Fi or picocell telecommunication.

To the accomplishment of the foregoing and related ends, the subject disclosure, then, comprises the features hereinafter fully described. The following description and the annexed drawings set forth in detail certain illustrative aspects of one or more embodiments of the disclosure. However, these aspects are indicative of but a few of the various ways in which the principles of the subject disclosure may be employed. Other aspects, advantages and novel features of the subject disclosure will become apparent from the following detailed description of various example embodiments of the subject disclosure when considered in conjunction with the drawings.

DETAILED DESCRIPTION

Figure 1:
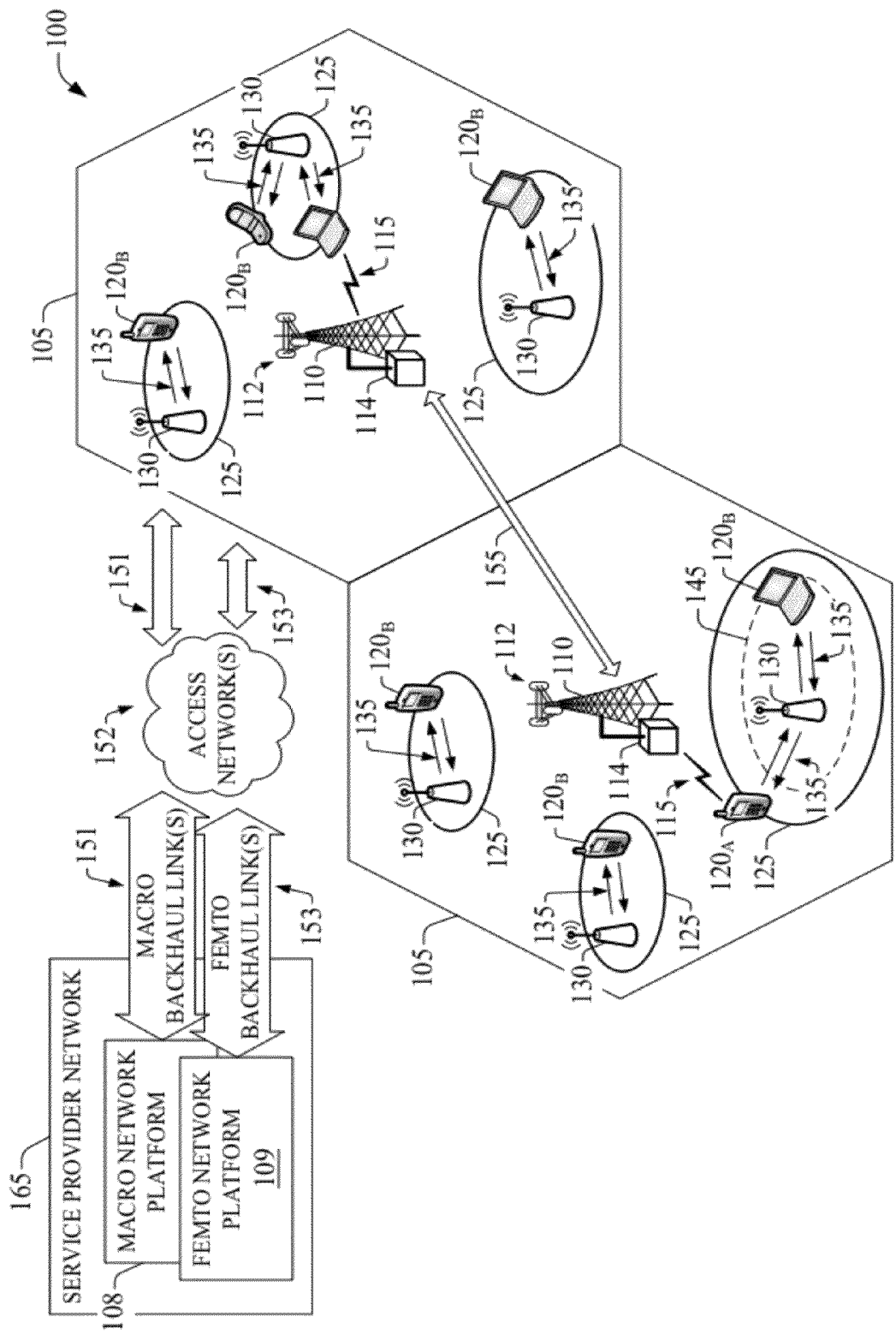
FIG. 1 illustrates a schematic deployment of a macrocell APs and femtocell APs for managing content (e.g., software) of wireless equipment (UE, CPE, etc.) over the air (OTA) in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the present disclosure. It may be evident, however, that the present disclosure may be practiced without these specific details. In other instances, well-known structures and devices are shown in block diagram form in order to facilitate describing the present disclosure.

As employed in this specification and annexed drawings, the terms "component," "system," "platform," "interface," "node," "coder," "decoder", "layer", and the like are intended to refer to a computer-related entity or an entity related to an operational apparatus with one or more specific functionalities, wherein the such entities can be either hardware, a combination of hardware and software, software, or software in execution. One or more of such entities are also referred to herein as "functional elements." As an example, a component may be, but is not limited to being, a process running on a processor, a processor, a memory, a code object, an executable code instruction, a thread of execution, a program, and/or a computer. By way of illustration, both an application running on a server and the server can be a component. One or more components may reside within a process and/or thread of execution and a component may be localized on one computer and/or distributed between two or more computers. In addition, these components can execute from various computer readable media having various data structures or code instructions stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, node, driver, coder, decoder, layer, and the like.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP);" "base station," "Node B;" "evolved Node B (eNode B);" "home Node B (HNB)" or "home access point (HAP)," which include femtocell access point, picocell access point, Wi-Fi base station . . . ; and the like, are utilized interchangeably in the subject application, and refer to a wireless network component or apparatus that at least delivers and receives data, control, voice, video, sound, gaming, or substantially any or any data stream or signaling stream. Sources or recipients of such data, control, voice, video, sound, gaming, or substantially any or any data stream or signaling stream can be at least a set of network components such as, but not limited to, user equipment, customer premises equipment, or network servers, controllers, gateways or management components. Data and signaling streams can be packetized or frame-based flows. It is noted that context in the subject specification generally distinguishes amongst a base station that provides or is intended to provide primarily outdoor wireless coverage and a facility-based access point (e.g., femtocell AP) that provides or is intended to provide primarily indoor wireless coverage or outdoor wireless coverage within a confined range. Explicit distinction between indoor-serving AP and outdoor-serving base station is made when context may be insufficient to distinguish the utilized terms.

Furthermore, the terms "user," "subscriber," "customer," "consumer," and the like are employed interchangeably throughout the subject specification, unless context warrants particular distinction(s) among the terms. It should be appreciated that such terms can refer to human agent(s) or automated component(s) supported through artificial intelligence (e.g., a capacity to make inference based on complex mathematical formalisms) which can provide simulated vision, sound recognition and so forth.

Further yet, the term "set" as employed herein excludes the empty set. Thus, a "set" in the subject disclosure includes one or more elements or entities. As an illustration, a set of gateway nodes includes one or more gateway nodes; a set of access points includes K access points with K a natural number greater than or equal to unity (1); a set of backhaul links spans one or more backhaul link(s); etc. In addition, as employed herein, the term "subset" can include the empty set unless otherwise noted, as in cases in which, for instance, disclosure of a subset of one or more entities is intended to expressly exclude the empty subset.

Features or aspects described in the subject disclosure can rely, at least in part, on delivery or reception of directive(s), indication(s), request(s), or the like, and information or payload data (e.g., content(s)) associated therewith. Directive(s) can be embodied in multi-bit words (e.g., P-bit words, with P a positive integer) and coded to specifically convey a request to a particular functional element (e.g., a femtocell AP) in order to execute one or more specific operation. Information or payload data within signaling, and request(s) or indication(s) conveyed therein, can be embodied, for example, in one or more reserved bits in a packet header, a light-payload (e.g., of the order of 1 byte) data packet, a predetermined multi-bit word conveyed in a control channel, a lightweight file (e.g., a cookie), an email communication, an instant message, or the like. In addition, directive(s), request(s), indication(s), or the like, as described herein, can be delivered in accordance with various communication protocols. As an example, the various protocols can include at least one of file transfer protocol (FTP), secure shell FTP (SFTP), FTP over secure socket layer (FTPS), short message service (SMS) protocol, multimedia messaging service (MMS) protocol, unstructured supplementary service data (USSD) standard, simple network management protocol (SNMP), lightweight directory access protocol (LDAP), session initiation protocol (SIP), SIP for Instant Messaging and Presence Leveraging Extensions (SIMPLE), Open Mobile Alliance (OMA) device management (DM) protocol, Technical Report 069 (TR-069) protocol, also referred to as Customer Premise Equipment (CPE) Wide Area Network (WAN) Management Protocol or CWMP, or the like.

While aspects or features of the subject disclosure are illustrated in terms of applicability to femtocell access points, such aspects and features are also applicable to, and can be exploited in, other radio access points such as Wi-Fi APs, picocell base station, microcell base stations, or the like, which may provide greater radio access capacity.

Various illustrative scenarios are set forth herein to represent example operational environments that exploit one or more features of femtocell service preservation through secondary connections as described herein, and reveal the utility of such one or more features. The various illustrative scenarios are, of course, not exhaustive of the multiple operational environments in which the one or more features described in the subject disclosure can be exploited. In addition, the various illustrative scenarios and related examples are intended to be non-limiting, without restricting the applicability or utility of the various embodiments of systems and methods described herein, or any modification or variations thereof. Various scenarios or embodiments of systems and apparatuses (wireless equipment, servers, confined-coverage APs, etc.) are presented in terms of systems that may include a number of devices, components, modules, and the like. However, it is to be understood and appreciated that the various of the described systems and apparatuses may include additional devices, components, modules, etc., or may not include all of the devices, components, modules, etc., discussed in connection with the annexed drawings. A combination of these approaches to present the various scenarios or embodiments of the subject disclosure also can be used.

With respect to the drawings, FIG. 1 illustrates a schematic deployment of macrocells and femtocells for wireless service coverage in accordance with aspects of the subject disclosure. In wireless environment 100, two areas 105 represent macrocell (macro) coverage; each macrocell is served by a base station 110, which includes a set of one or more antennas 112 and various equipment or apparatuses 114 that enable operation of the base station 110. It should be appreciated that macrocells 105 are illustrated as hexagons; however, macrocells can adopt other geometries generally dictated by the deployment or floor plan, geographic areas to be covered (e.g., a metropolitan statistical area (MSA) or rural statistical area (RSA)), and so on. Macro coverage is generally intended to serve mobile wireless devices, like UE $120_A$, in primarily outdoor locations. An over-the-air wireless link 115 provides such coverage; the wireless link 115 comprises a downlink (DL) and an uplink (UL), and utilizes a predetermined band of the radio frequency (RF) spectrum. As an example, UE $120_A$ can be a Third Generation Partnership Project (3GPP) Universal Mobile Telecommunication System (UMTS) mobile phone. It is noted that a base station, its associated electronics, circuitry or components, and a wireless link operated in accordance to the base station form a radio access network (RAN). In addition, base station 110 communicates with macro network platform 108 via backhaul link(s) 151 through one or more components (e.g., radio network controller(s), aggregator component(s) . . . ) that are part of access network(s) 152; aspects and deployment of the one or more components are dictated by the underlying radio technology employed for telecommunication. In cellular wireless technologies (e.g., 3rd Generation Partnership Project (3GPP) Universal Mobile Telecommunication System (UMTS), Global System for Mobile Communication (GSM)), macro network platform 108 represents a core network (CN). In an aspect, macro network platform 108 controls a set of base stations 110 that serve either respective cells or a number of sectors within such cells. Macro network platform 108 also communicates with other base stations (not shown) that serve other cells (not shown). Backhaul link(s) 151 can include a wired backbone link (e.g., optical fiber backbone, twisted-pair line, T1/E1 phone line, a digital subscriber line (DSL) either synchronous or asynchronous, an asymmetric ADSL, or a coaxial cable . . . ). Backhaul pipe(s) 155 link disparate base stations 110.

In wireless environment 100, within one or more macrocells 105, a set of femtocells 125 served by respective femtocell (femto) access points (APs) 130 can be deployed; in the subject disclosure, femtocell 125 is also referred to as confined-coverage area 125. While in illustrative wireless environment 100 three femtocells are deployed per macrocell, aspects of the subject innovation are geared to femtocell deployments with substantive femto AP density, e.g., $10^4$-$10^8$ femto APs 130 per base stations 110. A femtocell 125 typically covers an area that includes confined area 145, which is determined, at least in part, by transmission power allocated to femto AP 130, path loss, shadowing, and so forth. While coverage area associated with femtocell 125 and confined area 145 typically coincide, it should be appreciated that in certain deployment scenarios, confined coverage area 125 can include an outdoor portion (e.g., a parking lot, a patio deck, a recreation area such as a swimming pool and nearby space) while area 145 spans an enclosed living space or residence space. The coverage area associated with femtocell 125 typically is spanned by a coverage radius, or coverage range, that ranges from 20 to 100 meters. The confined coverage area 125 can encompass a setting that can span about 5000 sq. ft., and can include a residential dwelling, such as a single-family home or an apartment; a business space (e.g., a hotel); an enterprise place of operation; a factory; an entertainment area which can include bars, night-clubs, or the like; a worship area such as a church or mosque; an educational facility, which can include open and semi-open spaces as it may be the case in a college campus; a wellness area, e.g., a health club; a hospital or nursing home; etc., and access to wireless service typically is regulated. In addition or in the alternative, instead of being stationary, the confined coverage area 125 can be mobile; for example, it can be part of a vehicle (a car, an elevator, an aircraft, a vessel, etc.). It should be noted that the confined coverage area is substantially smaller, e.g., 1-3 orders of magnitude smaller, than a macrocell 105.

In the subject disclosure, a confined coverage area, such as confined coverage area 125, embodies a confined wireless environment, which, as indicated supra, can include indoor space, outdoor space, or a combination thereof. In addition, femtocell AP (e.g., 130) or any other type of access point (e.g., Wi-Fi AP, picocell AP) that serves the confined coverage area (e.g., 125) is referred to as confined-coverage AP, to denote that such an AP provides wireless service coverage to a confined wireless environment. Moreover, a confined-coverage AP transmits electromagnetic radiation (e.g., radiates) at lower power than a base station intended for outdoor coverage and that serves a macrocell. In an aspect, a confined-coverage AP (e.g., femtocell AP, picocell, Wi-Fi AP) that serves the confined coverage area (e.g., 125) can be deployed within the indoor space (e.g., within a building or structure) that the AP serves; outdoor space that is part of the confined coverage area (e.g., confined coverage area 125) also is served by the AP. In yet another aspect, a confined-coverage AP that serves the confined coverage area (e.g., 125) can be deployed in the outdoor space that the AP serves; in certain deployments the AP can be mounted on or attached to non-residential structure present in the outdoor space that is part of the confined area. A confined coverage area (e.g., confined coverage area 125) referred to in the subject disclosure is owned or leased by the owner or lessee of the AP that serves the confined coverage area; where the AP is deployed as part of structure (mobile or stationary) within the confined coverage area.

A femto AP 130 typically serves a few (for example, 1-5) wireless devices (e.g., subscriber station $120_B$) within confined coverage area 125 via a wireless links 135 which encompasses a downlink (DL) and an uplink (UL). A femto network platform 109 can control such service, in addition to mobility handover from macro-to-femto handover and vice versa, and registration and provisioning of femto APs. Control, or management, is facilitated by backhaul link(s) 153 that connect deployed femto APs 130 with femto network platform 109 through one or more components of access network(s) 152. The one or more components can include a network interface device (NID), a gateway node, a digital subscriber line (DSL) access multiplexer (DSLAM), or the like. In addition, the one or more components of access network(s) 152 can be functionally coupled to an access aggregator node, which can be embodied in a broadband remote access server (B-RAS); such aggregator node generally is functionally coupled to a femtocell gateway node (not shown) deployed (e.g., installed, configured, and active) within femto network platform 109. Backhaul pipe(s) 153 are substantially the same as backhaul link(s) 151. In UMTS-based radio technology, backhaul link 150 is embodied, at least in part, in Iuh interface.

In an aspect of the subject innovation, part of the control effected by femto AP 130 is based on measurements of radio link conditions and other performance metrics. Femto network platform 109 also includes components, e.g., nodes, gateways, and interfaces, that facilitates packet-switched (PS) (e.g., internet protocol (IP)) traffic and signaling generation for networked telecommunication. It should be appreciated that femto network platform 109 can be femto AP 130 can integrate seamlessly with substantially any packet switched (PS)-based and circuit switched (CS)-based network such as macro network platform 108. Thus, operation with a wireless device such as $120_A$ is substantially straightforward and seamless when handover from femto-to-macro, or vice versa, takes place. As an example, femto AP 130 can integrate into an existing 3GPP Core Network via conventional interfaces, or reference links, such as Iu-CS, Iu-PS, Gi, or Gn. In addition, femto AP 130 can serve a mobile device that operates in accordance with 3GPP radio technology(ies) without dedicated functionality, such as Wi-Fi transceivers.

It is to be noted that substantially all voice or data active sessions associated with subscribers within femtocell wireless coverage (e.g., confined coverage area 125) are terminated once the femto AP 130 is shut down; in case of data sessions, data can be recovered at least in part through a buffer (e.g., a memory) associated with a femto gateway at the femto network platform. Coverage of a suspended or hotlined subscriber station or associated account can be blocked over the air-interface. However, if a suspended or hotlined customer who owns a femto AP 130 is in Hotline/Suspend status, there is no substantive impact to the customers covered through the subject femto AP 130. In another aspect, femto AP 130 can exploit high-speed downlink packet access either via an interface with macro network platform 108 or through femto network platform 109 in order to accomplish substantive bitrates.

In addition, in yet another aspect, femto AP 130 has cell identifier(s) (e.g., in UMTS-based radio technology, a LAC (location area code) or a RAC (routing area code)) that is different from the underlying macro network. It should be appreciated that in macro networks, cell identifiers (IDs) such as LAC and RAC are reused over several base stations, or Node Bs, and large areas so location information, or intelligence, accuracy and attachment procedure(s) (e.g., Location Area Update (LAU) or Routing Area Update (RAU)) frequency are relatively low. It should be noted that based at least in part on radio technology deployment for macro networks, cell ID reuse granularity may differ, wherein radio technologies with distributed processing and more signaling capacity may afford more granular cell ID (e.g., LAC and RAC) assignments.

Femto LAC and RAC are used to identify subscriber station location for a variety of reasons, most notably to direct incoming voice and data traffic to appropriate paging transmitters, and emergency calls as well. As a subscriber station (e.g., UE $120_A$) that exploits macro coverage (e.g., macrocell 105) enters femto coverage (e.g., confined coverage area 125), the subscriber station (e.g., UE $120_A$) attempts to attach to the femto AP 130 through transmission and reception of attachment signaling. The signaling is effected via wireless links (DL/UL) 135; in an aspect of the subject innovation, the attachment signaling can include a Location Area Update (LAU) or Routing Area Update (RAU). As an example of attachment procedure and mechanism(s) associated therewith, UMTS handsets monitor network pilots, e.g., generated through a femtocell, or femtocell AP, while in the idle mode; each pilot includes LAC and/or RAC. As a subscriber station moves between pilots, e.g., moves within a macro sector and reaches vicinity of a femtocell, the subscriber station probes for a change in LAC or RAC. When a change in LAC or RAC is detected, the subscriber station performs LAU and/or RAU so mobile network(s) becomes aware of subscriber station location in order to properly route incoming call pages. Attachment attempts are thus a part of procedures to ensure mobility, so voice calls and data sessions can be initiated even after a macro-to-femto transition or vice versa.

It is to be noted that UE $120_A$ can be employed seamlessly after either of the foregoing transitions. In addition, femto networks typically are designed to serve stationary or slow-moving traffic with reduced signaling loads compared to macro networks. A service provider network 165 (e.g., an entity that commercializes, deploys, or utilizes femto access points 130 and macro base stations 110) is therefore inclined to minimize unnecessary LAU/RAU signaling activity at substantially any opportunity to do so, and through substantially any available means. It is to be noted that substantially any mitigation of unnecessary attachment signaling/control is advantageous for femtocell, or femtocell AP, operation. Conversely, if not successful, UE $120_A$ is generally commanded (through a variety of communication means) to select another LAC/RAC or enter "emergency calls only" mode. It is to be appreciated that this attempt and handling process can occupy significant UE battery, and femto AP capacity and signaling resources (e.g., communication of pilot sequences) as well.

When an attachment attempt is successful, UE $120_A$ is allowed on femtocell 125, and incoming voice and data traffic are paged and routed to the subscriber through the femto AP 130. To facilitate voice and data routing, and control signaling as well, successful attachment can be recorded in a memory register, e.g., a Visited Location Register (VLR), or substantially any data structure stored in a network memory. It is to be noted also that packet communication (e.g., voice and data traffic, and signaling) typically paged/routed through a backhaul broadband wired network backbone 153 (e.g., optical fiber backbone, twisted-pair line, T1/E1 phone line(s), T3 phone line(s), digital level zero line (DS0), digital subscriber line (DSL) either synchronous or asynchronous, an asymmetric DSL, a coaxial cable . . . ). To this end, femto AP 130 is typically connected to the broadband backhaul network backbone 140 via a broadband modem (not shown) or, more generally, a local gateway node (see, e.g., FIG. 2). In an aspect of the subject innovation, femto AP 130 can display status indicators for power, active broadband/DSL connection, gateway connection, and generic or specific malfunction. In another aspect, no landline is necessary for femto AP 130 operation.

Figure 2:
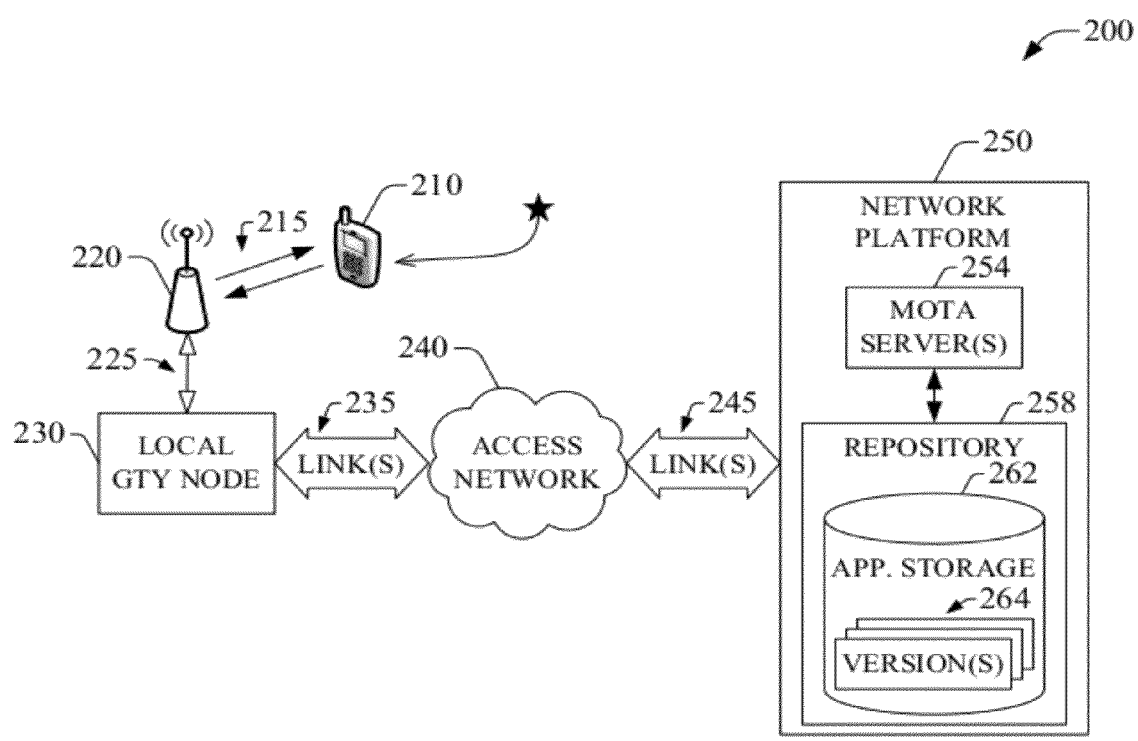
FIG. 2 illustrates an example system that enables and exploits management of content (e.g., software application(s)) OTA in accordance with aspects described herein.

FIG. 2 is a block diagram of an example system 200 that enables and exploits management of content (e.g., software application(s)) over the air (OTA) in accordance with aspects described herein. Various features of functional elements (UE, AP, server(s), etc.) included in example system 200 are illustrated in connection with example embodiments of the functional elements as presented in FIGS. 3-5. Management of content can include updates of content; activation or deactivation of content; audits of content, such as execution of control applications intended to measure performance of the wireless equipment; or the like. In example system 200, UE 210 embodies equipment (UE, CPE, etc.) configured to communicate wirelessly and, thus, it is referred to as wireless equipment. UE 210 can attach to an AP 220 as a result of a mobility event, e.g., displacement (open arrow) of UE 210 from a location (indicated with a star) served via a disparate AP (e.g., a macrocell Node B; not shown) to the coverage area of AP 220. Other operational events, such as power-on of UE 210 in the area of coverage of AP 220, also can result in attachment of UE 210 to AP 220. Attachment to AP 220 (or any access point) can arise from UE 210 scanning its wireless environment to detect presence of disparate frequency carriers (e.g., UMTS EM spectrum carriers) with improved radio link conditions with respect to a set of frequency carriers currently utilized by the UE 210. The radio link conditions can be evaluated through one or more signal-quality metrics, e.g., signal-to-noise ratio (SNR), signal-to-interference-and-noise ratio (SINR), raise-over-thermal noise (ROT), increased RSS, and so forth. Detection of at least one frequency carrier with improved radio link condition(s) generally arises from mobility events, such as transitioning from an outdoor wireless environment into an indoor wireless environment. UE 210 can scan its wireless environment periodically, conditionally, or on-demand (e.g., service through UE 210 is unsatisfactory and an end-user thereof requests scanning the wireless environment of UE 210 for frequency carriers with improved signal quality metric(s)).

In certain embodiments, such as example embodiment 300, UE 210 includes a radio interface 302 that enables wireless communication with AP 220 via wireless link(s) 215. Wireless link(s) 215 can have the same or substantially the same functional features as wireless links 135; thus, wireless link(s) 215 can include an UL and a DL. Wireless link(s) 215 also can include point-to-point radio link(s), such as Bluetooth® link(s). The radio interface 302 comprises one or more antenna(s) 303 functionally coupled to a communication platform 306. Wherein, as described hereinafter in connection with FIG. 4, the one or more antennas(s) 304 can receive and transmit wireless signal(s) and the communication platform 306 can process (encode/decode, multiplex/demultiplex, etc.) such wireless signal(s) for transmission from UE 210 or for reception and utilization by UE 210. Antenna(s) 303 also include circuitry for filtering, amplification, and other suitable manipulation of collected or transmitted wireless signal(s). Radio interface 302 enables exchange of wireless signal(s), and related payload data encoded therein, amongst AP 220 and UE 210 in order for UE 210 to attach to AP 210.

In scenarios of particular, though not exclusive, relevance to the subject disclosure, such as those illustrated in FIG. 2, access point 220 is a confined-coverage AP (femtocell AP, picocell AP, Wi-Fi AP, etc.) that operates, at least in part, in accordance with aspects described herein in connection with APs that provide wireless service to confined areas 125. As described supra, a confined-coverage AP is a low-power AP, e.g., the confined-coverage AP radiates at a transmitted power that is about one or more orders of magnitude smaller that power transmitted by a macrocell base stationt. In addition, and in contrast to macrocell base stations which are public, a confined-coverage AP is private or semi-private—e.g., the confined-coverage AP is owned or leased by the owner or lessee of the confined area served by the confined-coverage AP. In typical scenarios, a confined-coverage AP is deployed as part of structure within the confined area served by the confined-coverage AP. Since a confined-coverage AP provides wireless coverage that is private or semi-private, attachment of UE 210 to a confined-coverage AP generally is regulated in accordance with at least one access control protocol (or procedure). In cases access point 220 is a confined coverage AP and UE 210 is deemed adequate for attachment to such confined-coverage AP based at least on the at least one access control protocol, UE 210 camps on AP 220—e.g., UE 210 executes a configuration procedure that enables it to consume wireless service through the confined-coverage AP 220.

After camping in AP 220, which in example system 200 is a confined-coverage AP, UE can consume wireless service, at least in part, through a radio interface (e.g., 302) and wireless link(s) 215 which functionally couple (e.g., communicatively couple) the UE 210 to the AP 220. To consume wireless service, UE 210 directly or indirectly exchanges data and signaling with other device(s) or network platform 250. While UE 210 is pictorially represented with a smartphone, it should be appreciated that UE 210 is not limited to such particular mobile device. UE 210 can be any mobile device (e.g., cellphone, laptop computer with wireless connectivity card, netbook, digital video recorder (DVR) . . . ) that utilizes wireless network resources (electromagnetic spectrum carriers or bandwidth, telecommunication channels, etc.) to telecommunicate voice or data. In certain embodiments, UE 210 can be a wearable device with enabled wireless capability that is attached to a subscriber's garment or gear (goggles, helmet, etc.) or is mounted on a subscriber's body part.

To provide wireless service (e.g., wireless delivery and reception of data and signaling) to UE 210 in a scenario in which AP 220 is a confined-coverage AP, access point 220 is functionally coupled (e.g., communicatively coupled) to a local gateway (gty) node 230 via link(s) 225. It is noted that in the subject disclosure when referring to an example system, apparatus, or device, open arrows and associated connecting segments represent link(s) or interface(s) that functionally couple components, APs, servers, nodes, or the like, that in the illustrated example embodiment(s) generally are not integrated into a single functional element. However, in alternative embodiments, some of such components, servers, nodes, or the like, may be integrated into a single functional element. In contrast, solid arrows and associated connecting segments represent functionally coupled functional elements (components, servers, APs, nodes, or the like) that, in the illustrated example embodiments, can be integrated, at least in part, into a single functional element even though such functional elements are represented as separate entities. In addition, AP 220 exploits local gateway node 230 to establish a telecommunication channel to network platform 250, or at least one network node therein, via links 235 and 245, and AN 240. The local gty node 230 is coupled to access network 240 through link(s) 235. The telecommunication channel can be a packet-based protocol channel, such as a virtual private network (VPN) channel, for example, and is typically persistent. Thus, the telecommunication channel should be maintained functional for the AP 220 (which is a confined-coverage AP in the subject scenario) and served wireless equipment to access wireless service (e.g., femtocell service). In an aspect, link(s) 225 can be embodied in at least one wired link or at least one wireless link. In one or more embodiments, link(s) 225 is a single wired link functionally attached (e.g., with active transmission of signal(s)) to local home gateway node 230. Access network 240 is functionally coupled to network platform 250 via link(s) 245 and at least one network gateway node (not shown). In an aspect, access network 240 is part of access network(s) 152 and, accordingly, access network 240 can be embodied and can operate in substantially the same manner as an access network that is part of access network(s) 152. Link(s) 235 and link(s) 245 can be embodied and can operate in substantially the same manner as a link in the set of femto backhaul link(s) 153. In one or more embodiments, local gateway node 230 is a DSL modem or a cable modem. In alternative or additional embodiments, local gateway node 230 is a network interface device (NID). Local gateway node 230 can be distinguished from a network gateway node at least as follows. The local gateway node 230 is embodied in customer premises equipment (CPE) that serve as a data and control gateway to the network platform 250 from at least a portion of the confined area served by AP 220, whereas the network gateway node is not embodied in CPE but resides within network platform 250.

Additionally, in response to camping in AP 220 (which in example system 200 is a confined-coverage AP), UE 210 initiates a management OTA (MOTA) session automatically. The MOTA session allows, at least in part, UE 210 to acquire (receive, request, retrieve, etc.) content specific thereto and related to operation thereof from MOTA server(s) 254. Such content is germane to at least one feature of UE 210, where the at least one feature includes a hardware feature, a software feature, a security feature, an access clearance feature, a location feature, or a combination thereof. In certain embodiments, to initiate the MOTA session automatically, UE 210 can operate as follows. UE 210 determines if an identifier (ID) code (e.g., LAC) of access point 220 is within a range of ID codes specific to confined-coverage APs; a network operator that administers AP 210 and provides related wireless service can define such range. In an aspect, to conduct the determination, UE 210 can compare the ID code of AP 220 received as part of attachment thereto with values of ID codes assigned to confined-coverage APs, wherein such values embody the range indicated supra and can be retained in memory that is part of UE 210 or functionally coupled thereto. In case the outcome of the determination is negative, e.g., the comparison of the ID code of AP 210 with the range of ID codes assigned to confined-coverage APs reveals that AP 210 is not a confined-coverage AP, UE 210 continues operation without automatic MOTA. In the alternative, in case outcome of the determination is affirmative, the AP 210 is recognized as a confined-coverage AP. In response to recognition of AP as a confined-coverage AP (femtocell AP, picocell AP, Wi-Fi AP, etc.), UE 210 can configure (e.g., generate, define, encode . . . ) a variable that conveys attachment to a confined-coverage AP; the variable can be alphanumeric, logical, or numeric, and is indicative of attachment condition or presence condition and, thus, the variable can be referred to as a confined-coverage presence indicator. As an example, the variable can be labeled "femto_presence" and it can be set to a "TRUE" value as a result of recognition of AP 210 as a confined-coverage AP. In one or more scenarios, after the confined-coverage presence indicator is configured to disclose UE 210 is camped in a confined-coverage AP, UE 210 can associate a specific alphanumeric tag (A-tag) to the confined-coverage presence indicator and display the alphanumeric tag, which can be linked, in a one-to-one relationship, for example, to the ID code of AP 210. In example embodiment 300, an attachment component 304 enables UE 210 to determine if AP 220 is a confined-coverage AP. In an aspect, attachment component 304 can perform such determination in accordance with aspects described supra. Attachment component 304 can exploit a set of one or more range(s) of AP ID codes (e.g., set 330) retained in memory 324. Moreover, attachment component 304 can configure the confined-coverage presence indicator as described herein.

As part of the MOTA disclosed herein, recognition of AP 210 as a confined-coverage AP also leads UE 210 to (a) execute an application that consumes a MOTA service, which can be hosted by MOTA server 254 in network platform 250; and (b) connect to the MOTA server 254. Connection to the MOTA server 254 can occur in response to execution of such application. As part of connection to the MOTA server, UE 210 can establish at least one Packet Data Protocol (PDP) context that serves, in part, as a packet-based tunnel connection from UE 210 to the MOTA server 254. In an embodiment, e.g., example embodiment 300, attachment component 304 enables UE 210 to execute the application that consumes the MOTA service. In an aspect, attachment component 304 can signal (e.g., convey a directive to) processor(s) 320 to execute such application, wherein the application can be retained in application (app.) storage 326. In an additional or alternative aspect, attachment component 304 can signal an update driver component 308, also referred to as update driver 308, to execute such application. In an illustrative scenario, termed herein the "firmware" scenario, update driver 308 can include a portion of processor(s) 320, e.g., at least one processor that is part of processor(s) 320; update driver 308 executes the application via the at least one processor. Moreover, in example embodiment 300, update driver 308 can establish the PDP context and thus connect UE 210 or enable UE 210 to connect to the MOTA server 254. Execution of the application that consumes the MOTA service can control the operation of update driver component 308 in accordance with aspects described herein. Furthermore, with respect to MOTA server 254, in one or more embodiments thereof, such as example embodiment 500, a connectivity component 508 can exchange one or more messages with UE 210 in order to connect thereto, e.g., establish a PDP context associated with UE 210. In an aspect, connectivity component 508 can exploit peripheral interface 512 to functionally couple to a network node (e.g., gateway node(s)) or to at least one link in order to communicate with UE 210 and establish the PDP context or substantially any packet-based protocol tunnel (e.g., a VPN tunnel, such as IPSec tunnel or GPRS tunnel). In a related aspect, peripheral interface 512 also can allow connection of MOTA server 254 to various network nodes or devices. Peripheral interface 512 can include a set of ports, which comprises at least one of parallel port(s), serial port(s), Ethernet port(s), V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394. Peripheral interface 512 also can include other types of input/output (I/O) interface(s) that enable, at least in part, networked communication.

Content that can be managed OTA in accordance with aspects of the subject disclosure and that is related to operation of UE 210 can be related to ensuring performance integrity or improving performance of the UE 210. Thus, a MOTA session initiated automatically as described supra, can be referred to as a "fix" OTA (FOTA) session. In an illustrative scenario, the content can be a software (SW) application or a SW component associated with the SW application. For example, the SW application can be a system SW application such as an operating system (OS), a firewall, or the like, whereas the related SW component can be a configuration file, a library, a class, an object, a module, and so forth. Moreover, in such illustrative scenario, the MOTA session can enable the UE 210 to update the SW application or the related SW component(s). As an illustration, the related SW component(s) can be associated with dependencies (modules, libraries, data structures, etc.) of the SW application. To at least that end, as part of implementation of a MOTA session, UE 210 can convey an indication of equipment identification (EID) for the UE 210. Such indication can convey at least one EID code or token that characterizes hardware of UE 210. Substantially any EID code can be employed after the MOTA server 254, or a component therein, has been configured to recognize the at least one EID code or token. As an example, various EID codes or tokens can include an International Mobile Equipment Identity (IMEI), an MDN, a Telecommunications Industry Association (TIA) Electronic Serial Number (ESN) such as User Identity Module Identifier (UIMID) or Expanded UIMID, or a multi-bit ID number such as Mobile Equipment Identifier (MEID), or the like. In addition, to enable update of the SW application or the related SW component(s), UE 210 conveys an indication of an in-use version of the SW application or the related SW component. It is noted that in certain embodiments UE 210 can transmit a single, consolidated indication that conveys the indication of EID for UE 210 and the indication of the in-use version of the SW application or related SW component(s). In example embodiment 300, a version management component 312 (also referred to as version manager 312) enables UE 210 to convey the indication of EID and the indication of in-use version of the SW application or the related SW componenet(s). In an aspect, version manager 312 generates the indication of EID and supplies such indication to radio interface 302 for delivery to MOTA server 254. In another aspect, version manager 312 generates the indication of in-use version of SW application or related SW component(s) and supplies such indication to radio interface 302 for delivery to MOTA server 254. In yet another aspect, version management component 312 generates such indications and composes the single, consolidated indication described supra; version manager 312 then conveys the single, consolidated indication to radio interface 302 for delivery to MOTA server 254. Execution of the application that consumes the MOTA service controls operation of version manager 312 in accordance with aspects described herein.

In response to reception (e.g., collection, collection and decoding . . . ) of the indication of EID for UE 210 and the indication of the in-use version of the SW application or related SW component(s), MOTA server 254 determines if a version of the SW application or the related SW component(s) that is newer than the in-use version is available. MOTA server 254 performs such determination as part of the MOTA session. In an aspect, to perform such determination, MOTA server 254 can query a repository 258 accessible (e.g., functionally coupled) to the MOTA server 254 for a current or last-known version of the SW application available for the received EID. Record(s) of version(s) of at least one SW application can be retained in memory element(s) (register(s), file(s), database(s), etc.) within application storage 262, which also can retain the at least one SW application and related SW component(s). The memory element(s) can embody the set of one or more version record(s) 264 (or version(s) 264). Repository 258 can be a centralized element or a distributed element. MOTA server 254 can compare the outcome of the query with the received in-use version of the SW application or the related SW component(s) and, based on the comparison, determine if such newer version is available. The repository 258 can reside within the FOTA server 254 or it can be functionally coupled thereto and resident within a network platform that contains the MOTA server 254. For instance, in example embodiment 500, memory 520 can embody, at least in part, repository 258, and app. storage 524 can embody app. storage 262. The set 526 of one or more version(s) of SW applications embody, in part, the set 264.

In certain embodiments, MOTA server 254 can request additional data related to UE 210 in order to establish availability of a newer version of the SW application or related SW component(s). For example, MOTA server 254 can request data indicative of subscriber type, e.g., premium subscriber, and based on the subscriber type determined such availability: A newer version of an SW application can be available for premium subscribers but nor for regular subscribers. Likewise, in an enterprise deployment, a newer version of an SW application can be available for a first segment of end-users (e.g., business end-users, end-users with specific security clearance(s) . . . ) within the enterprise but not for a second segment of end-users (e.g., R&D end-users) IMSI for the for certain subscribers. Moreover, availability of an SW application and related SW component(s) can be based on location of UE 210 within the enterprise.

In a scenario in which MOTA server 254 establishes a newer version of the SW application or the related SW component(s) is unavailable, MOTA server 254 conveys an indication to UE 210 that such newer version is unavailable. In the alternative, in a scenario in which server 254 establishes that a newer version of the SW application or the related SW component(s) is available, MOTA server delivers a request for an update instruction to UE 210. In one or more embodiments of MOTA server 254, e.g., example embodiment 500, a version manager component 504 (or version manager 504) enables MOTA server 254 to determine availability of a newer version of a SW application or related SW component(s) with respect to an in-use version conveyed by UE 210. In an aspect, version manager 504 determines such availability in accordance with aspects described supra. Version manager 504 can utilize a device-to-version (dev.-to-ver.) mapping in the set of dev.-to-ver. mapping(s) 528 to identify a current or last known version of the SW application of the related SW component(s). As illustrated in example embodiment 500, MOTA server 254 can retain, in an application (app.) storage 524, one or more versions 526 of SW application(s) or related SW component(s) for a group of wireless equipment. At least one of such version is logically coupled to a WE via at least one mapping in dev.-to-ver. mapping(s) 528. In addition, version manager 504 can retain a record of the newer version that the UE 210 is informed to be available; the record can be retained in a set of version record(s) 532 and can serve as content update intelligence.

As part of the MOTA session, UE 210 receives (e.g., collects, decodes) the request for an update instruction (e.g., a computer-executable command) and, in response, generates such instruction. The update instruction indicates whether an update of a SW application or related SW component(s) is to be accepted or declined. The update instruction can be generated upon (or substantially at the time of) reception of the request. Alternatively, the request can be queued for generation of the update instruction at a time subsequent to reception of the request. In an embodiment, e.g., example embodiment 300, update driver 308 can receive the request for the update instruction and can generate the update instruction. In a first example modality, UE 210 can generate the update instruction through collection of input data indicative of acceptance (e.g., "Proceed") or rejection ("Decline") of an update of the SW application or the related SW component(s)—such update is referred to as SW update. The source (end-user, disparate equipment, etc.) of the input data can be external to the UE 210. In an aspect, UE 210 can render a user-interface (e.g., graphical user-interface (UI), aural UI, or a UI that is combination thereof) that enables collecting the data. UE 210 can include a display interface (e.g., display interface 316) that renders the user-interface.

The display interface 316 can include a display component (not shown) that can convey visual or aural indicia. Various schemes can be employed to render the user-interface to convey acceptance or rejection of SW update: For example, windows-based schemes (e.g., iconic representation, pop-up representation), or text-based representation(s), with scroll-down or scroll-sideways delivery, or static rendering. Based on complexity of the UE 210, for example, the display component (not shown) can be embodied, at least in part, in various types of displays, e.g., a cathode ray tube (CRT) monitor, a Liquid Crystal Display (LCD) monitor, a plasma monitor, a light emitting diode (LED) monitor, an electrochromic monitor, or the like. The display component (not shown) also can enable communication of aural indicia, for example, via speaker(s).

The display interface (not shown) can enable entry of data that determined an update of content is to be accepted or declined. In addition, in example embodiment 300, the display interface (not shown) can collect entry of data, through a data entry component (not shown) that can enable UE 210 to receive external commands or configuration information. The display interface 316 can process (e.g., decode/code), at least in part, received input data and can convey it as signaling to one or more functional elements (component(s), platform(s), etc.) or memory 324 within UE 210. To mitigate fraudulent transaction(s), entry of data can be secured through various credential-based mechanisms, such as password protection, biometric protection, or the like, and an associated secured transport protocol(s) that can include data encryption. In an aspect, one or more sets of code instructions that can be executed to implement such credential-based mechanisms can be retained within the application storage 326.

In a second example modality of generation of an update instruction, UE 210 can generate the update instruction automatically, without end-user intervention, by analyzing at least one operation condition of the UE 210 and, based on the related analysis, assessing whether a download is feasible (e.g., it can be completed successfully). The at least one operation condition can include, for example, an amount of radio resources (scheduled traffic, bandwidth, channels, etc.) available to the UE 210, or an amount of processing resources (scheduled tasks, processor load, available memory, etc.) available to UE 210 for usage. The at least operation condition also can include telecommunication performance of the UE 210 and related key performance indicators (KPIs), such as rate of data packet loss, rate of call session loss, time interval for call session establishment, data rate, or the like. If a download is feasible, then UE 210 sets the update instruction to indicate acceptance (e.g., "Proceed") of the SW update. In certain embodiments, e.g., example embodiment 300, update driver 308 can implement the foregoing analysis and assessment and generate the update instruction based on an outcome of the analysis and assessment. In an aspect, update driver 308 or component(s) therein, can evaluate the at least operating condition of the UE 210 and determine whether a download is feasible by gauging an outcome of such evaluation with a group of performance thresholds related to the KPIs for UE 210. Update driver 308 also can report outcome(s) of an evaluation operating condition(s); e.g., update driver 308 can deliver or store data that records such performance. A performance threshold in the group of performance thresholds can be specific to radio resource availability, processing availability, data and signal transport quality, connection reliability, etc. The performance thresholds can be predetermined, either statically or dynamically, and can be retained in a memory element (register, database, file, etc.; not shown) within memory 324. Moreover, a performance threshold can be specific to the UE 210, which enables application of disparate criteria for download feasibility for disparate wireless equipment. For example, a mobile device of a subscriber of telecommunication carrier that provides wireless service via a femto AP (e.g., AP 220) can have lower performance thresholds if related directly to the owner or lessee of the femto AP than in case the subscriber is not directly related to the owner or lessee.

It is noted that a modality of generation of the update instruction that arises from combination of two or more of the foregoing example modalities is also possible.

In case an update instruction indicates a SW update is accepted or is to be performed, UE 210 requests (e.g., delivers a query or a command) MOTA server 254 to transfer at least one file related to the newer version of the SW application or the related SW component(s). In an embodiment, such as example embodiment 300, update driver 308 can generate and deliver a command (e.g., computer-executable instruction) that requests MOTA server 254 to transfer the at least one file. The at least one file and payload data therein can convey the SW application (source code, executable code, etc.) or the related SW component(s) (one or more of a library, a class, an object, a module, etc.). MOTA server 254 receives the request and, in response thereto, delivers the at least one file related to the newer version of SW application or the related SW component(s) to UE 210. UE 210 receives (collects, decodes, etc.) the at least one file and implements the SW update. To implement the SW update, UE 210 commits (e.g., stores or causes to store) the at least one file. In an example, UE 210 stores the at least one file in a memory functionally coupled thereto (e.g., memory 324 in example embodiment 300) and processes the at least one file to cause the newer version of the SW application or the related SW component(s) to be suitable for consumption by the mobile device. In an aspect, UE 210 processes the at least one file in accordance with the type(s) of the at least one file: For an executable file, UE 210 can point to a new memory address in the memory for execution of the at least one file. For a file that conveys a library or other type of SW component associated with the SW application, UE 210 can link an extant executable instance of the SW application to the library or the other type of SW component. For a file that includes source code (or computer-executable programming instructions), UE 210 can compile and link the at least one file and generate an executable instance of the SW application based on the compiled and linked file. Moreover, in an aspect, as part of committing the at least one file, UE 210 can update a version data structure (relational table, data tree, file system, etc.) or at least one record thereof. The version data structure maintains a version record of the SW application or SW component(s) related thereto. The version data structure also can maintain record(s) of dependencies of the SW application with disparate SW component(s). A set of one or more version data structure(s) can be retained in a set 332 of one or more memory elements (register(s), file(s), databases, etc.) within memory 324.

Additionally, as part of implementation of the SW update, UE 210 terminates the MOTA session initiated in response to camping in the confined-coverage AP 220 and restarts (or reboots) with the newer version of the of SW application or the related SW component(s). It should be appreciated that the termination of the MOTA session can be part of the restart procedure. In various embodiments of UE 210, such as example embodiment 300, update driver 308 can enable UE 210 to implement the SW update. In an aspect, update driver 308 implements, at least in part, the SW update.

Figure 3:
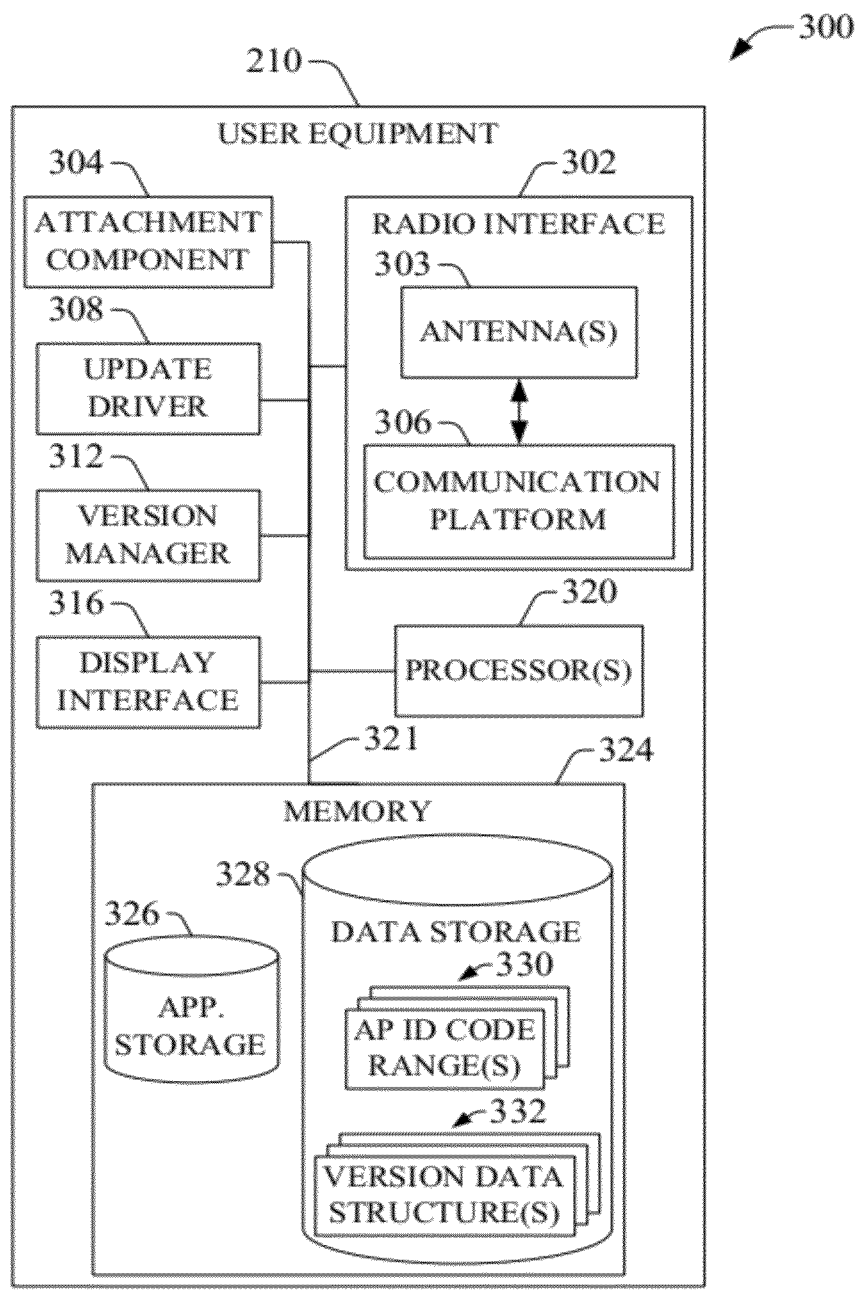
FIG. 3 represents an example embodiment of wireless equipment (UE, CPE, etc.) that can operate in accordance with aspects described herein.

As illustrated in embodiment 300 in FIG. 3, UE 210 includes processor(s) 320 that can be configured to enable or that can enable, at least in part, functionality of substantially any or any component(s), platform(s), interface(s), node(s), and so forth, within UE 210 in accordance with aspects of operation thereof as described herein. Bus 321 functionally couples processor(s) 320 to each functional element within UE 210 and to memory 324; the bus 321 can be embodied in at least one of a memory bus, a system bus, an address bus, a message bus, a power bus, or one or more reference link(s) or interface(s). In example embodiment 300, processor(s) 320 are illustrated as external to the various functional elements (e.g., component(s), interface(s), platform(s), node(s)) of UE 210; however, in additional or alternative embodiment(s), processor(s) 320 can be distributed amongst a plurality of two or more of such functional elements. In alternative or additional embodiment(s), one or more functional elements of UE 210 can reside within memory 324 as one or more sets of computer-executable instructions that, in response to execution by processor(s) 320, implement the various functional elements and described functionality thereof.

Processor(s) 320 also can supply information to and retrieve information from memory 324. Such information can enable, at least in part, operation of or can provide, at least in part, functionality to the various functional element(s) of UE 210. The information can include at least one of computer-executable instructions (e.g., computer-executable programming code), computer-executable programming code structure(s), data structures, or the like.

Additionally, processor(s) 320 can execute computer-executable instructions (not shown) stored in memory 324, for example within application storage 326 in order to provide at least in part the described functionality of UE 210. The computer-executable instructions also can resided within other memory(ies) (e.g., removable memory card(s)) functionally coupled to UE 210. Such computer-executable instructions (e.g., computer-executable programming code) can include program modules, or software applications or firmware applications that implement, at least in part, various methods described in the subject disclosure.

Memory 324 also can retain, at least in part in the application storage 326 or in data storage 328, at least one of data structures (e.g., objects, classes, metadata); computer-executable programming code structure(s) (e.g., modules, procedures) or computer-executable programming code instructions; or substantially any type of software application(s) or firmware application(s) that processor(s) 320 can execute to enable, at least in part, functionality associated with substantially any or any component(s), platform(s), interface(s), or functional element(s) of UE 210 in accordance with aspects described herein. In addition, memory 324 can store, within data storage 328, for example, network or device information such as one or more communication protocol(s) or technical specification(s); code sequences for scrambling or spreading; blind decoding hypotheses; semi-persistent scheduling parameters; frequency offsets, macrocell base station identifiers and femtocell AP identifiers (IDs); address book(s); or the like. Moreover, memory 324 can retain content(s) such as multimedia files or subscriber-generated data.

Memory 324 can include non-removable or removable elements, such as a subscriber identification module (SIM) card storage, a universal integrated circuit card (UICC) storage, or a removable user identity module (RUIM). In one or more embodiments or scenarios, at least a portion of memory 324 and content thereof can be external to UE 210 and linked thereto via peripheral interface (not shown).

Figure 4:
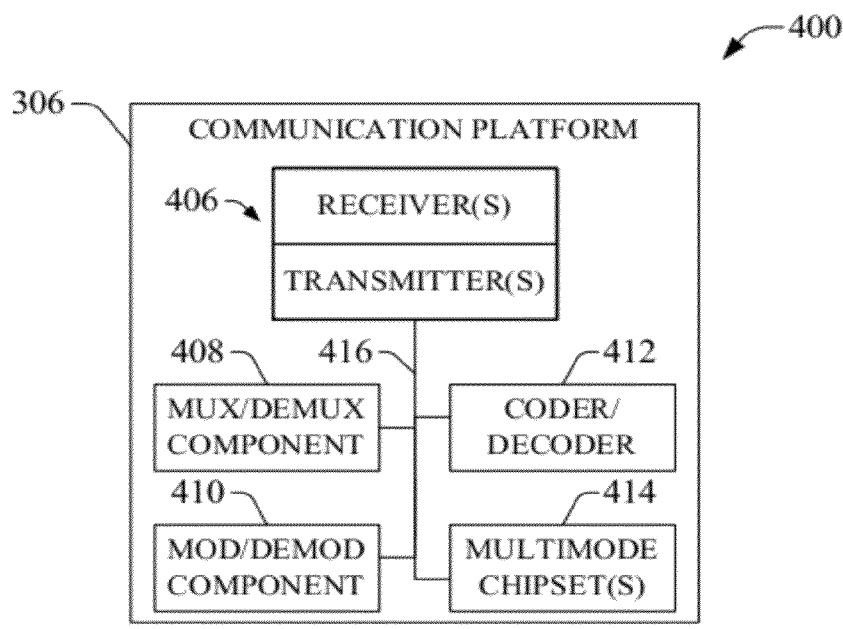
FIG. 4 illustrates an example embodiment of a communication platform that is part of wireless equipment (UE, CPE, etc.) in accordance with aspects described herein.

As indicated supra, UE 210 exploits communication platform 306 that is part of a radio interface 302 to communicate wirelessly with at least AP 220 (which is a confined-coverage AP). In general, wireless equipment that communicates with AP 220 and operates in accordance with aspects of the subject disclosure includes communication platform(s) that operate in substantially the same manner as configuration platform 306. FIG. 4 is a block diagram of an example embodiment 400 of a communication platform 306 in accordance with aspects described herein. Communication platform 306 comprises electronic components and associated circuitry that enable processing and manipulation, e.g., coding/decoding, deciphering, modulation/demodulation, of signal(s) received by UE 210 and signal(s) to be transmitted by UE 210; received or transmitted signal(s) are modulated and coded, or otherwise processed, in accordance with various radio technology protocols (e.g., 3GPP UMTS, 3GPP LTE . . . ). Communication platform 306 can operate in accordance with a configurable set of radio technologies, or communication protocols thereof; procedures that when executed, for example, by a processor, implement such communication protocols can be retained in memory 324. As new radio technologies become standardized, or available, a network operator that provides telecommunication service via femtocell network can introduce such technologies in the set of radio technologies that can be utilized for telecommunication through a femto AP (embodied in AP 220 in certain scenarios) deployed in a confined-coverage area.

Components, or functional elements, in communication platform 306 exchange information through a bus 416; information includes data, code instructions, signaling and related payload data, or the like, and the bus 416 can be embodied in at least one of a system bus, and address bus, a data bus, a message bus, or a reference link or interface. The electronic components and circuitry can include receiver(s)/transmitter(s) 406, and component(s) therein, a multiplexer/demultiplexer (mux/demux) component 408, a modulator/demodulator component 410, a coder/decoder 412, and a set of one or more chipsets, e.g., multimode chipset(s) 414.

Receiver(s)/transmitter(s) 406 can can convert signal(s) from analog to digital upon or shortly after reception, and from digital to analog upon or shortly before transmission. Signals that are received or converted to be transmitted have wavelengths in the radiofrequency, microwave, or infrared portion of the EM spectrum. Such wavelengths can be grouped in a set of carrier bands. In an aspect, the set of EM radiation carrier bands can include at least one of (i) all or substantially all licensed EM carrier bands, or (ii) all or substantially all unlicensed carrier bands currently available for telecommunication. It is noted that the set of carrier bands is configurable and can be upgraded to incorporate carrier bands as such bands become available for telecommunication, e.g., auctioned for utilization or authorized for free-of-charge utilization. In an embodiment, a server in network platform 250 (e.g., provisioning server that is part of OSS/BSS) can enable configuration of the set of EM carrier bands.

Receiver(s)/transmitter(s) 406 also can divide a single data stream into multiple parallel data streams, or perform the reciprocal operation; such operations are typically conducted in various multiplexing schemes. In addition, based upon antenna structure (e.g., antenna(s) 224; not shown in FIG. 3) and radio telecommunication protocol, receiver(s)/transmitter(s) 306 can divide a single data stream into multiple, parallel data streams, or perform the reciprocal operation. At communication platform 306, signals that are received or converted to be transmitted can have wavelengths in the visible to microwave portion of the EM spectrum. Wavelengths of EM radiation manipulated (e.g., received, transmitted, or processed) by communication platform 306 can be determined at least in part by a network administrator that deploys a wireless network that enables communication of access point(s) with wireless equipment configured to utilize communication platform 306.

In communication platform 306, functionally coupled to receiver(s)/transmitter(s) 406 is a multiplexer/demultiplexer component 408 that enables manipulation in time and frequency domain of received signal(s) or signal(s) to be transmitted via a radio telecommunication interface, such as radio interface 302 (not shown in FIG. 4). Electronic mux/demux component 408 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, based on telecommunication protocol employed for radio telecommunication, mux/demux component 408 can scramble and spread information (e.g., codes) according to substantially any code known in the art; e.g., Hadamard-Walsh codes, Baker codes, Kasami codes, polyphase codes, and so on. A modulator/demodulator (mod/demod) component 410 is also a part of communication platform 306, and can modulate information according to multiple modulation techniques, such as frequency modulation, amplitude modulation (e.g., M-ary quadrature amplitude modulation (QAM), with M a positive integer), phase-shift keying (PSK), and the like. Mod/demod component 410 also can demodulate information processed in accordance with the foregoing modulation techniques. In example embodiment 400, mod/demod component 410 is functionally coupled to mux/demux component 408 via bus 416. In an aspect, processor(s) 320 can enable, at least in part, UE 210 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc.

Communication platform 306 also includes a coder/decoder 412 that operates on data in accordance with one or more coding/decoding schemes suitable for communication, at least in part, through receivers(s)/transmitter(s) 406. In an aspect, the coding/decoding schemes, or related procedures, can be retained as a group of one or more code instructions in memory 324. Coder/decoder 412 can process signal(s) (code signal(s), decode signal(s), compress/decompress signal(s), encrypt/decrypt signal(s), extrapolate or interpolate, etc.) that are received or that are to be transmitted in accordance with a radio telecommunication protocol. In an aspect, decoding can be based at least in part on blind decoding of received signal(s), computation of log-likelihood ratios (LLR) associated with constellation realization for a specific demodulation; maximum likelihood (ML) estimation, minimum mean square equalization (MMSE), zero forcing (ZF) filtering, or maximal ratio combining (MRC) filtering. In another aspect, when communication through radio interface 302 exploits multiple-input multiple-output (MIMO), multiple-input single-output (MISO), single-input multiple-output (SIMO) or single-input single-output (SISO) operation, coder/decoder 412 can implement at least one of space-time block coding (STBC) and associated decoding; or space-frequency block (SFBC) coding and associated decoding. Coder/decoder 412 also can extract information from data streams coded in accordance with spatial multiplexing scheme. In addition, to operate in the manner described herein, coder/decoder 412 can employ, at least in part, mux/demux component 408 and mod/demod component 410.

Multimode chipset(s) 414 can enable communication platform 306 to operate in multiple communication modes through various radio network technologies (e.g., second generation (2G), third generation (3G), fourth generation (4G)) or deep-space satellite-based communication in accordance with disparate technical specifications, or standard protocols, for the radio network technologies or satellite communication. The various radio network technologies can be part of the set of radio technologies described supra. In an aspect, multimode chipset(s) 414 can enable, at least in part, communication platform 306 to operate in accordance with standard protocols specific to a telecommunication mode of operation, e.g., Long Term Evolution (LTE)-based communication. In another aspect, multimode chipset(s) 414 can be scheduled to operate concurrently in various modes or within a multitask paradigm in which the multimode chipset(s) 414 operates in a dedicated mode for a specific time interval.

Functional elements, e.g., component(s), coder/decoder, receiver(s)/transmitter(s), in communication platform or functionally coupled thereto are functionally connected via bus 416. Bus 416 enables exchange of data, signaling, or any other information, amongst the functional elements connected through such bus. In an aspect, bus 416 can be embodied in at least one of a memory bus, a system bus, an address bus, a message bus, or any other conduit, protocol, or mechanism for data or information exchange among components that execute a process or are part of execution of a process. In addition, bus 416 can include a power bus.

Figure 5:
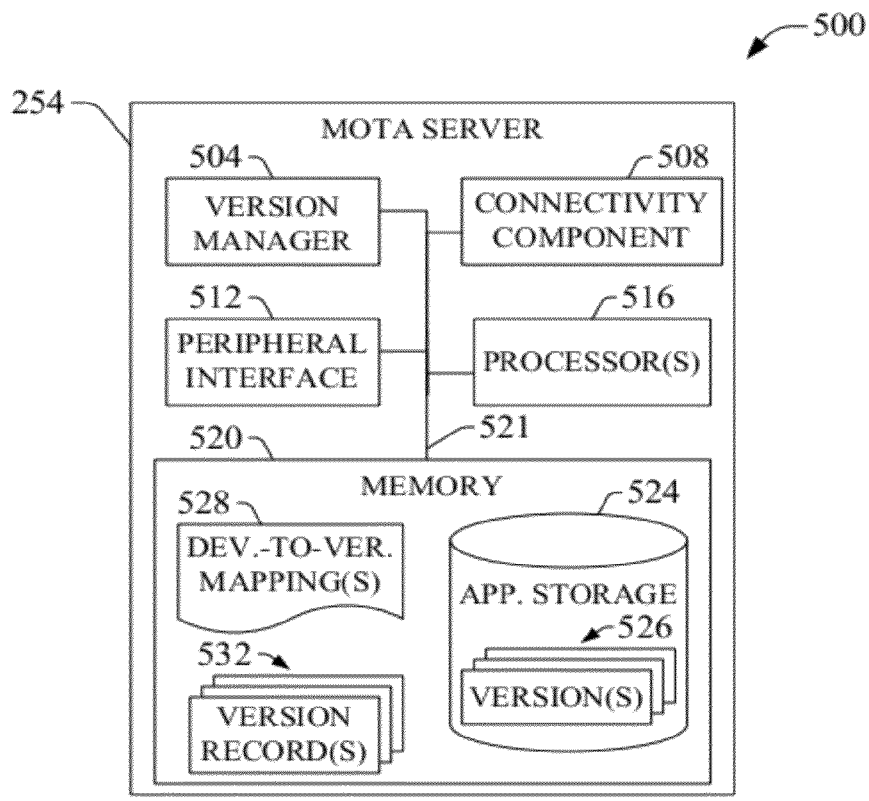
FIG. 5 presents an example embodiment of a server that enables, at least in part, management of content (e.g., software application(s)) OTA for wireless equipment (UE, CPE, etc.) in accordance with aspects of the subject disclosure.

With respect to example embodiment 500 illustrated in FIG. 5, MOTA server 254 includes processor(s) 516 that can be configured to enable or that can enable, at least in part, functionality of substantially any or any component(s), platform(s), interface(s), node(s), and so forth, within MOTA server 254 in accordance with aspects of operation thereof as described herein. Bus 521 functionally couples processor(s) 516 to each functional element within MOTA server 254 and to memory 520; the bus 521 can be embodied in at least one of a memory bus, a system bus, an address bus, a message bus, a power bus, or one or more reference link(s) or interface(s). In example embodiment 500, processor(s) 516 are illustrated as external to the various functional elements (e.g., component(s), interface(s)) of MOTA server 254; however, in additional or alternative embodiment(s), processor(s) 516 can be distributed amongst a plurality of two or more of such functional elements. In further alternative or additional embodiment(s), one or more functional elements of MOTA server 254 can reside within memory 520 as one or more sets of computer-executable instructions that, in response to execution by processor(s) 516, implement the various functional elements and described functionality thereof.

Processor(s) 516 also can supply information to and retrieve information from memory 520. Such information can enable, at least in part, operation of or can provide, at least in part, functionality to the various functional element(s) of MOTA server 254. The information can include at least one of computer-executable instructions (e.g., computer-executable programming code), computer-executable programming code structure(s), data structures, or the like.

Additionally, processor(s) 516 can execute computer-executable instructions (not shown) stored in memory 520, for example within application storage 524 in order to provide at least in part the described functionality of MOTA server 254. The computer-executable instructions also can reside within other memory(ies) (e.g., a consolidate network repository within network platform 250 or repository 258) functionally coupled to MOTA server 254. Such computer-executable instructions (e.g., computer-executable programming code) can include program modules, or software applications or firmware applications that implement, at least in part, various methods described in the subject disclosure.

Memory 520 also can retain, at least in part in the application storage 524 or in data storage (not shown), at least one of data structures (e.g., objects, classes, metadata); computer-executable programming code structure(s) (e.g., modules, procedures) or computer-executable programming code instructions; or substantially any type of software application(s) or firmware application(s) that processor(s) 516 can execute to enable, at least in part, functionality associated with substantially any or any component(s), platform(s), interface(s), or functional element(s) of MOTA server 254 in accordance with aspects described herein. In addition, memory 520 can store, within data storage (not shown), for example, network information such as authentication protocol(s), billing information, subscriber information including service profile(s); or the like. Moreover, memory 520 can retain subscriber-generated data.

Figure 6A:
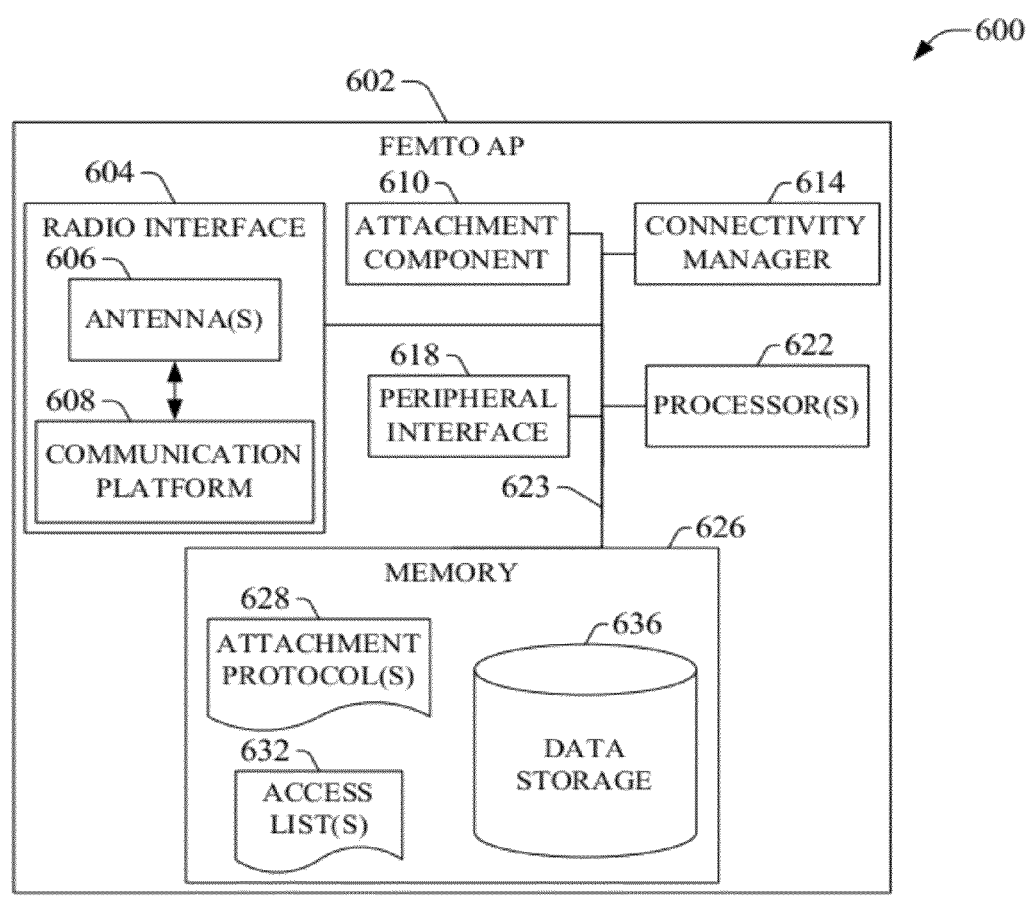
FIGS. 6A-6B present example embodiments of a femtocell AP that can couple wireless equipment (UE, CPE, etc.) with a network node (e.g., a server) to enable various features of the subject disclosure.
Figure 6B:
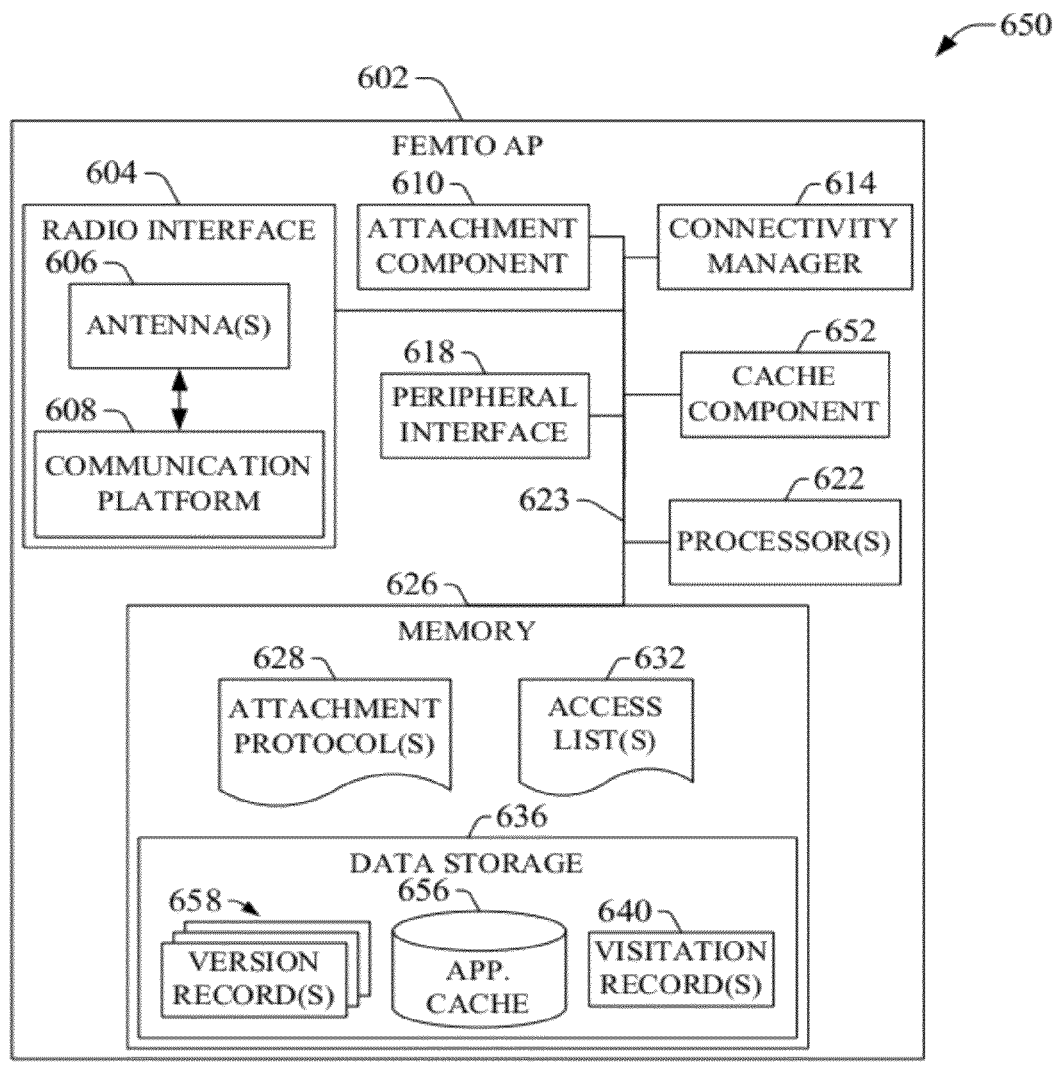

FIGS. 6A-6B are block diagrams of example embodiments 600 and 650 of a femtocell AP 602 that can couple wireless equipment (UE, CPE, etc.) with a network node (e.g., a server such as MOTA server 254) to enable various features of the subject disclosure. Femto AP 302 can embody one or more femtocell APs or any other confined-coverage AP referred to and described herein. To enable wireless service, femto AP 602 includes radio interface 604. Communication platform 608 can operate in substantially the same manner or in similar fashion as communication platform 306. It should be appreciated that to operate in femto AP 602, possible modifications or extensions to communication platform 608 with respect to communication platform 306 do not entail undue experimentation. Communication platform 608 includes at least the same functional elements (components, antennas, mod/demod, coder/decoder, multimode chipset(s), etc.) as communication platform 304. As described supra, communication platform 608 can comprise a set of receiver(s)/transmitter(s). Receiver(s)/transmitter(s) are functionally coupled to antenna(s) 606. The set of receiver(s)/transceiver(s) in communication platform 608 can transmit and receive signal via peripheral interface 618 and antenna(s) 606.

Additionally, to enable exchange of data and signaling amongst wireless equipment (e.g., UE 210) and a network platform (e.g., network platform 250), femto AP 602 includes a peripheral interface 618. Such exchange is part of wireless service enabled by femto AP 302. Peripheral interface 618, via, e.g., an Ethernet port therein, enables connection of femto AP 602 to a local gateway node (e.g., 230). To at least such end, peripheral interface 618 includes at least one set of ports. Connection of femto AP 602 to the local gateway node (e.g., 230) can lead femto AP 602 to establish automatically a connection with a network gateway node in network platform 250. Peripheral interface 618 also enables connection to a peripheral device and communication therewith. As an example, peripheral interface 324 can allow connection of an external antenna to receive global navigation data, e.g., global positioning system (GPS) data; the antenna can reside in an outer location of a confined area served by femto AP 602, so the antenna is exposed to open sky. As another example, peripheral interface 618 can enable connection of femto AP 602 to disparate femto AP(s). Peripheral interface 618 can include a set of ports, which comprises at least one of parallel port(s), serial port(s), Ethernet port(s), V.35 ports, X.21 ports, wherein parallel ports can comprise General Purpose Interface Bus (GPIB), IEEE-1284, while serial ports can include Recommended Standard (RS)-232, V.11, Universal Serial Bus (USB), FireWire or IEEE-1394.

As described supra, a confined-coverage AP, such as femto AP 602, generally provides wireless coverage that is private or semi-private. Accordingly, attachment of wireless equipment (e.g., UE 210; not shown in FIGS. 6A-6B) to the confined-coverage AP generally is regulated in accordance with at least one access control procedure. Femto AP 602 includes attachment component 610, which can implement (e.g., executes) an access control procedure. The access control procedure can be retained as part of a set of attachment protocol(s) 628 stored in one or more memory element(s) (register(s), database, file(s), etc.) in memory 626. As part of the access control procedure, attachment component 610 exchanges identifier (ID) codes with wireless equipments that attempts attachment femto AP 602. Thus, femto AP 602 can supply identification credentials to the wireless equipment and vice versa. The access control procedure can exploit at least a portion of such identification credentials to regulate access to femto AP 602; namely, to control wireless equipment that can camp on femto AP 602. In an aspect, the access control procedure can be based, at least in part, on a group of one or more access control list(s). The group of one or more access control list(s) can be retained in one or more memory element(s) 632 (register(s), database, file(s), etc.) in memory 626.

An access control list (ACL) enables, at least in part, regulation of access to wireless service supplied through femto AP 602 and features of supplied wireless service. To at least that end, an ACL can comprise a set of access attributes, which identify devices that can communicate wirelessly and are authorized to receive telecommunication service through femto AP 602. An access attribute uniquely identifies a device. An owner or lessee of a femtocell (femto) AP can determine access attributes to be recorded in or removed from an access control list (ACL) associated with the femto AP. In certain alternative scenarios, based on service agreement with the owner or lessee or the femto AP, a telecommunication carrier that provides wireless service through the femto AP also can determine access attributes associated with the access control list. Determination of records to be entered or removed from an ACL can be effected dynamically and automatically based on a set of predetermined rules. For instance, based on service agreement, the ACL can be updated to include a WE identifier of a mobile device of a subscriber of the telecommunication carrier that provides wireless service through the femto AP. Accordingly, when the mobile device attaches to the femto AP, the mobile device can be recognized to be a mobile device of a subscriber of the telecommunication carrier and be included into the ACL, which allows the mobile device to camp in the femto AP and exploit MOTA service as described herein.

As illustrated, more than one ACL can be retained in memory 626; however, a single ACL can be active at a time in order to regulate access and provide wireless services. Memory 626 also can retain service attributes that control logic for provision of service to a wireless device identified in an ACL. Service attributes can be specific to femto AP 602. The logic for provision of service can establish at least one of the following features: (i) Supplied service(s), e.g., voice-only service, data-only service and available applications, voice and data service and provided applications associated with the service(s). In addition, radio technology employed to supply service(s) also can be set. (ii) Service priority, e.g., ranking of access to radio resources such as radio technology (3G or 4G), bandwidth, dedicated telecommunication channels. (iii) Access schedule or time constraints, such as time of day considerations, or expected duration of provided service. (iv) Level of service or access quality of service, e.g., quality of service (QoS) profile such as best effort, conversational, real-time. It should be appreciated that service attributes also can determine other service features.

A configuration (not shown) of service attributes, also referred to as a profile of service attributes or access profile, is specific to a mobile device identified in an access control list, even though it should be noted that a particular configuration of service attributes can display a one-to-many relationship with identified devices in an ACL. Accordingly, specification of a service attribute profile can customize provision of wireless service through femto AP 602.

An ACL associated with femto AP 602 or any confined-coverage AP can enable regulation of access thereto in at least the following manner. If the femto AP 602 (which can embody, for example, AP 220) receives attachment signaling (e.g., LAU signaling or RAU signaling in UMTS-based radio technology) originated by wireless equipment (e.g., UE 210), the femto AP 602 validates an identity (IMEI, MEID, IMSI, MSN, etc.) of the wireless equipment against the access control list, e.g., ACL(s), associated with the femto AP. Such identity can be conveyed in the attachment signaling. If validation against the ACL results in no match amongst the identity of the wireless equipment and a device identity retained in the ACL, the femto AP rejects the attachment signaling and the device is allowed only to establish emergency calls. In the alternative, if the identity of the wireless equipment matches an identifier in the ACL, the access control procedure that is based, at least in part, on the ACL is completed and femto AP 602 allows the wireless equipment to camp thereon and establish call sessions normally.

Femto AP 602 also includes connectivity manager 614. For wireless equipment (e.g., UE 210) camped on femto AP 602 and that implements (e.g., executes) management OTA of content related to operation of the wireless equipment as described herein, connectivity manager 614 can relay data and signaling related to establishment of a connection with a MOTA server (e.g., MOTA server 254) in a network platform (e.g., network platform 250). In an aspect, as described supra, connectivity manager 614 can relay data and signaling associated to establishment of a PDP context with the MOTA server. Connectivity manager 614 can relay data and signaling associated with most any tunnel-protocolAs part of relaying data and signaling, connectivity manager 614 receives the data or signaling from the wireless equipment via radio interface 604, and conveys the data or signaling to the MOTA server (not shown) through, in part, peripheral interface 618.

It should be appreciated that such data or signaling is conveyed indirectly to the MOTA server, via a plurality of functional elements deployed as part of link(s) 235 and 245, AN 240, and at least one network node.

In certain embodiments, e.g., example embodiment 650, femto AP 602 also can include a cache component 652. For each wireless equipment in a set of wireless equipment, the cache component 652 can access a MOTA server (e.g., MOTA server 254) and collect data indicative of a current version of content related to operation of the wireless equipment. Cache component 652 can access the MOTA server via connectivity manager 614 and peripheral interface 618. In the alternative or in addition, cache component 652 can access the MOTA server via peripheral interface 618 without reliance on connectivity manager 614. In an aspect, the set of wireless equipment can be statically configured. For example, the set of wireless equipment can include UE included in at least one ACL in ACL(s) 632. For another example, the set of wireless equipment can be based on subscription data and include UE that is part of a specific subscriber segment (e.g., business subscribers, premium subscribers, etc.) or that is served by a particular telecommunication carrier (e.g., the telecommunication carrier that provides wireless service via femto AP 602). In the alternative, the set of mobile devices can be established dynamically or quasi-statically, based at least on historical data related to visitation (e.g., attachment) to femto AP 602. In embodiment 650, for example, attachment component 610 can record data related to visitation to femto AP 602 over a specific period, and categorize UE that attaches to femto AP 602 into a group of segments or types. Data related to visitation to femto AP 602 can be retained in visitation record(s) 640 within memory 626. The group of segments can represent various frequencies of visitation or patterns of visitation. For instance, a first segment (e.g., of "Seldom" type) can represent a group of UE that rarely attach to femto AP, whereas a second segment (e.g., of "Routine" type) can represent a disparate group of UE that attaches to femto AP 602 frequently. Other segments also can be defined, for example, a third segment (e.g., "Indigenous") can represent UE that are directly associated with a subscriber (e.g., family members, room-mates) that owns or leases the femto AP 602.

To categorize wireless equipment that attaches to femto AP 602, attachment component 610 can exploit artificial intelligence (AI) techniques, which can be formalized in a methodology that is retained memory 626. Artificial intelligence techniques typically apply advanced mathematical algorithms or methods to a data set; such algorithms or methods are part of the methodology and can include decision trees, neural networks, regression analysis, principal component analysis (PCA) for feature and pattern extraction, cluster analysis, genetic algorithm, or reinforced learning. In particular, attachment component 610, or one or more components therein, can employ at least one of numerous methods for learning from the data set and then drawing inferences from models formally represented by employed method. Such learning can enable attachment component 610 to predict patterns of visitation and refine a set of wireless equipment segment. As an example, the numerous methods for learning can include Hidden Markov Models (HMMs) and related prototypical dependency models can be employed. General probabilistic graphical models, such as Dempster-Shafer networks and Bayesian networks like those created by structure search using a Bayesian model score or approximation can also be employed. In addition, linear classifiers, such as support vector machines (SVMs), non-linear classifiers like methods referred to as "neural network" methodologies, fuzzy logic methodologies can also be employed.

Cache component 652 can compare collected data of a current version of content related to operation of the wireless equipment with a version record associated with the content related to operation of the wireless equipment. The version record can be retained in a group 658 of one or more sets of version record(s), and can convey a version of the content related to operation of the wireless equipment acquired (downloaded, retrieved, received, etc.) before the date indicative of the current version of the content is collected. Based on the comparison, cache component 652 can determine that the current version is newer than the version conveyed by the version record and, in response, the cache component 652 acquire the content (e.g., file(s)) associated with the current version.

Cache component 652 can retain the acquired content associated with the current version in an application cache 656 within memory 626. In addition, after retention of such content, cache component 652 can transmit to the MOTA server an indication that the content associated with the current version is available for consumption in femto AP 602. In an aspect, the indication includes payload data indicative of the current version that is available for consumption, the wireless equipment for which the content is available, and a logical address (e.g., internet protocol (IP) address) of the application cache 656.

Application cache 656 enables, at least in part, local caching of updated version(s) of content related to operation of wireless equipment in the set of wireless equipment. In response to an indication of availability of content retained in application cache 656, the MOTA server (e.g., MOTA server 254) can activate local caching, wherein a cache variable (e.g., a logical flag) is configured to a value that represents the femto AP 602, and the application cache 656, as a source of updated content for the wireless equipment. Upon or after attachment of WE (e.g., UE 210) to femto AP 602 and after the WE is characterized as wireless equipment for which an updated version of content is available and an update of the content is allowed by the WE, the MOTA server can analyze the cache variable and determine that local caching is active. In response to local caching being active, the MOTA server (e.g., MOTA server 254) can direct the wireless equipment (e.g., UE 210) to acquire content associated with the updated version of content from the application cache 656 rather than to acquire such content from the MOTA server via backhaul network (not shown in FIG. 6). Included in a directive to acquire the content associated with the updated version thereof, the MOTA server (e.g., MOTA server 254) can deliver a logical address (e.g., an IP address) of the application cache 656 or memory 626 to the WE (e.g., UE 210), which can exploit the logical address to acquire (e.g., download) such content.

Femto AP 602 also can include a display interface (not shown), which can render various indicia associated with functions that control operation of femto AP 602 or reveal operation conditions thereof, e.g., available connectivity to backhaul broadband network. In addition, the display interface (not shown) can convey information (e.g., such as number of currently served mobile devices) to an end-user. Moreover, the display interface (not shown) can receive one or more directives to render an environment (e.g., display a user interface) to proceed with an update of content or to decline such update.

Various functional elements and associated circuitry that can embody, at least in part, data entry component (not shown) enable data input through one or more gestures (e.g., touch, speech, motion), one or more communication protocols. Such functional elements can include a keypad, a touch screen, a microphone, a camera(s); a bar code reader, radio frequency ID (RFID) reader, infrared (IR) wireless-based reader; or the like.

In certain embodiments, femto AP 602 can include a power supply (not shown), which can provide power to one or more components or functional elements that operate within femto AP 602. In an aspect, the power supply (not shown) can be rechargeable, e.g., it can be embodied in a rechargeable battery. In addition, the power supply (not shown) can include one or more transformers to achieve power level(s) that can operate femto AP 602 and component(s) or functional element(s), and related circuitry therein. In an aspect, the power supply (not shown) can attach to a conventional power grid to recharge, or ensure femto AP 602 is operational; the power supply (not shown) can include input/output (I/O) interface(s) (not shown), or connector(s) (not shown), to functionally attach to the conventional power grid. The power supply (not shown) also can include an energy conversion component(s) (not shown) such as a solar panel or a thermoelectric device or material, which can be external or internal to the femto AP 602, in order to provide additional or alternative power resources or autonomy to femto AP 602.

Femto AP 602 includes processor(s) 622 that can be configured to enable or that can enable, at least in part, functionality of substantially any or any component(s), platform(s), interface(s), node(s), and so forth, within femto AP 602 in accordance with at least one aspect of the operation thereof as described herein. Bus 623 functionally couples processor(s) 622 to each functional element within femto AP 602 and to memory 626; the bus 623 can be embodied in at least one of a memory bus, a system bus, an address bus, a message bus, a power bus, or one or more reference link(s) or interface(s). In example embodiments 600 and 650, processor(s) 622 are illustrated as external to the various functional elements (e.g., component(s), interface(s), platform(s), node(s)) of femto AP 302; however, in additional or alternative embodiment(s), processor(s) 622 can be distributed amongst a plurality of such functional elements. In some embodiment(s), one or more functional elements that comprise femto AP 602 can reside within memory 626 as one or more sets of computer-executable instructions that, that in response to execution by processor(s) 622, implement the various functional elements and described functionality thereof.

Processor(s) 622 also can supply information to and retrieve information from memory 626. Such information can enable, at least in part, operation of or can provide, at least in part, functionality to and the various functional element(s) of femto AP 602. The information can include at least one of computer-executable instructions (e.g., computer-executable programming code), computer-executable programming code structure(s), data structures, or the like.

Processor(s) 622 can execute computer-executable instructions stored in memory 626, for example, within application storage (not shown), in order to provide, at least in part, the described functionality of femto AP 602. The computer-executable instructions also can reside within other memory(ies) (e.g., removable memory card(s)) functionally coupled to femto AP 602. Such computer-executable instructions (e.g., computer-executable programming code) can include program modules or software applications or firmware applications that implement, at least in part, various methods described in the subject disclosure.

Memory 626 also can retain, at least in part in the foregoing application storage (not shown) or in data storage 636, at least one of data structures (e.g., objects, classes, metadata); computer-executable programming code structure(s) (e.g., modules, procedures) or computer-executable programming code instructions; or substantially any type of software application(s) or firmware application(s) that processor(s) 622 can execute to enable, at least in part, functionality associated with substantially any or any component(s), platform(s), interface(s), or functional element(s) within femto AP 602 in accordance with aspects described herein. In addition, memory 626 can store network or device information, e.g., within data storage (not shown), such as one or more communication protocol(s) or technical specification(s); code sequences for scrambling or spreading; blind decoding hypotheses; semi-persistent scheduling parameters; frequency offsets, macrocell base station identifiers and femtocell AP identifiers (IDs); address book(s); or the like. Moreover, memory 626 can retain content(s) such as multimedia files or subscriber-generated data. Memory 626 also includes access control list(s) 636 (or access list(s) 636).

Memory 626 can include non-removable or removable elements, such as a subscriber identification module (SIM) card storage, a universal integrated circuit card (UICC) storage, or a removable user identity module (RUIM). In one or more embodiments, at least a portion of memory 626 and content thereof can be external to femto AP 602 and linked thereto via peripheral interface 618.

Figure 7:
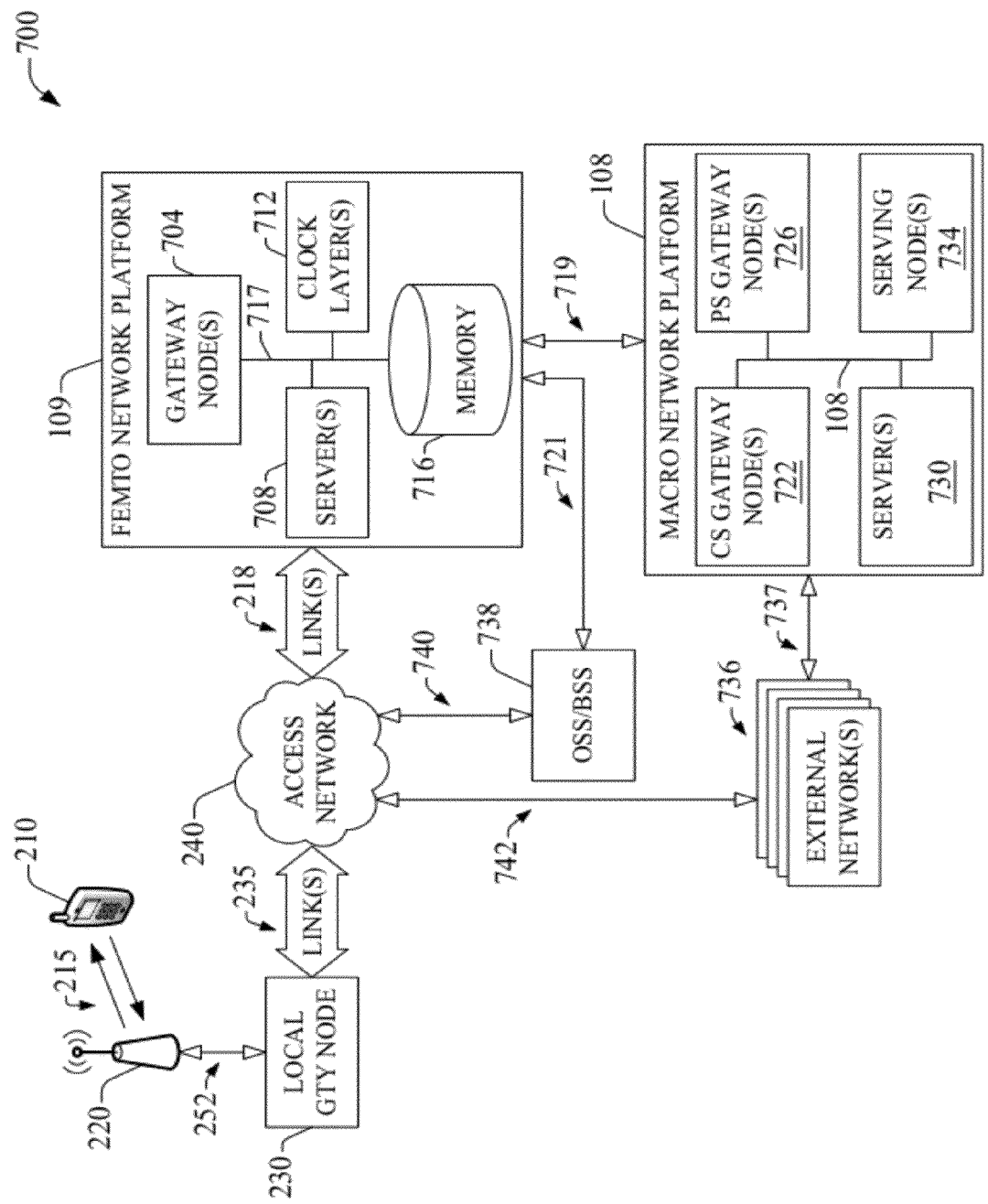
FIG. 7 depicts an example system that enables and exploits management OTA of content of wireless equipment (UE, CPE, etc.) in accordance with aspects described herein.

FIG. 7 is a block diagram of an example system 700 that enables and exploits management OTA of content of wireless equipment (UE, CPE, etc.) in accordance with aspects described herein. As described supra, content is germane to feature(s) of wireless equipment (WE) and is related to operation thereof. Content can include software (SW), e.g., a SW application or related SW component(s). Example system 700 includes various of the functional elements (UE 210, AP 220, AN 240, etc.) described in connection with example system 200. In addition example system 700 includes various network-based functional elements that embody network platform 250. The network-based functional elements include femto network platform 109, macro network platform 108, external network(s) 736, and Operations Support System (OSS)/Business Support Systems 738 (OSS/BSS 738), and a plurality of link(s). In an aspect, MOTA server(s) 254 (not shown in FIG. 7) can reside within one or more of femto network platform 109, macro network platform 108, external network(s) 736, or OSS/BSS 738. Such functional elements can include MOTA servers that are dedicated to management of specific type of content. As an example, femto network platform 109 can include a MOTA server that enables management of SW related to connectivity of wireless equipment (e.g., UE 210) with a femtocell AP (e.g., AP 220) or add-on services for control of devices, wireless or wireline, within the confined-coverage area served by the femtocell AP (e.g., AP 220). As another example, OSS/BSS 738 can include a MOTA server dedicated to management of SW for collecting data related to operation (e.g., dropped call sessions, mobility patterns, consumed services, etc.) of wireless equipment (e.g., UE 210) within a confined-coverage wireless environment or within a macrocellular wireless environment. Interface(s) 740 (reference link(s), wireless link(s), various bus architectures, etc.) functionally couple OSS/BSS 738 to the wireless equipment (e.g., UE 210), while interface(s) 721 (reference link(s), wireless link(s), various bus architectures, etc.) functionally couple OSS/BSS 738 to femto network platform 109. As yet another example, at least one external network in external network(s) 736 can include a MOTA server that enables management of SW for consumption of media services (video streaming, pay-per-view digital content, media-hosting applications, etc.), social networking services, or the like. As a further example, at least one external network that is part of a utility service provider (e.g., a power service provider) in external network(s) 736 can include a MOTA server that enables OTA management of SW that allows operation of CPE (e.g., a power-consumption meter). Interface(s) 742 (reference link(s), wireless link(s), various bus architectures, etc.) can functionally couple the at least one external network in external network(s) 736 to wireless equipment (e.g., UE 210) that can be managed, at least in part, via the MOTA server (not shown). Interface(s) 737 (reference link(s), wireless link(s), various bus architectures, etc.) functionally couple at least one external network in external network(s) 736 to macro network platform 108.

In example system 700, femto network platform 109 provides, in part, femtocell wireless service. Femto network platform 109 can serve or exchange traffic and signaling with wireless equipment (e.g. UE 210) through access network 240, which is linked to the femto network platform 109 via backhaul link(s) 218, and a femto AP (e.g., AP 220) via at least a local gateway node (e.g., local gateway node 230).

Femto network platform 109 includes component(s), node(s), gateway node(s), interface(s), server(s), or platform(s) that enable both packet-switched (PS) communication (e.g. IP-based communication, frame relay communication, ATM communication ...) and generation of control signaling for networked wireless communication. In an aspect, femto network platform 109 includes femto gateway node(s) 704, also referred to as gateway node(s) 704, which have substantially the same functionality as PS gateway node(s) 726 in macro network platform 108. A femto gateway node that is part of femto gateway node(s) 704 or a PS gateway node that is part of PS gateway node(s) 726 embodies a network gateway node. Femto gateway node(s) 704 also can include substantially all or all functionality of serving node(s) 734, described below. In an aspect, disparate femto gateway node(s) 704 can control or operate disparate sets of deployed femto APs (which can includes AP 220, for example). The group of femto gateway node(s) 704 can be expanded periodically or in accordance with a schedule to improve management (e.g., load balancing or other aspects of traffic scheduling) and functionality of a set of deployed femto APs. Femto network platform 109 also includes clock layer(s) 712, which can include the clock strata of network time protocol (NTP) and thus supply various time-based utilities and one or more time records.

Server(s) 708 have substantially the same functionality as described hereinafter in connection with server(s) 730. In an aspect, server(s) 708 can execute multiple application(s) that provide service (e.g., voice and data) to wireless devices served through access network 240 and associated femto AP(s). Server(s) 708 also can provide security features to femto network platform 109. Moreover, server(s) 708 can manage (e.g., schedule, queue, format ...) substantially all packetized flows (e.g., IP-based flows, frame-relay—based flows, ATM-based flows ...) the server(s) 708 generates in addition to data received, via interface(s) 719 (reference link(s), wireless link(s), various bus architectures, etc.), from macro network platform 108. Furthermore, server(s) 708 can provision, at least in part, femtocell service and exchange signaling, and related payload data, with one or more network components that effect activation of the femtocell service. Further yet, server(s) 708 also can implement operations and maintenance (O&M) procedures associated with at least one femto AP and one or more functional elements in femto network platform. In one or more scenarios, server(s) 708 can include one or more processors configured to enable or that enable, at least in part, the functionality of femto network platform 109 or one or more functional elements therein (gateway node(s), clock layer(s), etc.). To that end, the one or more processors in server(s) 708 can execute one or more sets of computer-executable instructions (e.g., computer-executable programming code) stored in memory 716, for example. Server(s) 708, or the one or more processors therein, can exchange data and signaling with various functional elements of femto network platform 109 via bus 717. In an aspect, the bus 717 can be embodied in at least one of a memory bus, a system bus, an address bus, a message bus, a power bus, or one or more reference link(s) or interface(s). Server(s) 708 can include at least one MOTA server that operates in accordance with aspects of the subject disclosure.

Memory 716 also can retain information relevant to operation of the various components of femto network platform 109 and femtocell service provided to one or more subscribers. For example operational information that can be stored in memory 716 can comprise subscriber intelligence, such as physical address(es), billing preference(s) and plan(s), one or more records of incidents; contracted services, which can include media entertainment, gaming, or the like; maintenance and service records related to femtocell service; femtocell configuration, including devices authorized for femtocell service and authorized subscribers (e.g., access control list(s)) associated with one or more deployed (e.g., provisioned and active) femto APs; service policies, such as service priority for a device attached to a deployed femto AP, and equipment specifications; privacy policies; add-on features, which can include parental controls; and so forth. In one or more embodiments, as indicate supra, memory 716 can retain one or more access control lists that regulate access to femtocell service from wireless equipment (e.g., UE 210).

Femto network platform 109 is functionally coupled (e.g., communicatively coupled) to macro network platform 108 via interface(s) 719. In an aspect, interface(s) 719 can be embodied in at least one of conventional link(s) (e.g., a fiber optic link, an Ethernet link, a T1/E1 line ...), reference link(s) (e.g., Gi, Gn ...), numerous bus architectures, or one or more components of an access network or a core network. Macro network platform 108 provides, in part, macrocell wireless service through circuit-switched (CS) domain services and packet-switched (PS) domain services. In the illustrated example embodiment, macro network platform 108 is directly coupled to external network(s) 736.

Macro network platform 108 can include one or more functional elements, e.g., component(s), node(s), gateway node(s), interface(s), server(s), or platform(s) that enable both packet-switched (PS) (e.g., internet protocol (IP), frame relay, asynchronous transfer mode (ATM)) and circuit-switched (CS) traffic (e.g., voice and data) and control generation for networked communication, wireless or otherwise. It should be appreciated that in cellular wireless technologies (e.g., 3GPP UMTS, HSPA, 3GPP LTE, 3GPP UMTS, 3GPP2 UMB), macro network platform 108 embodies a core network. PS gateway node(s) 726 can embody at least part of the PS domain. Functional element within the PS domain can enable exchange of notifications, indications, and directives in accordance with various networked communication protocols indicated herein, including one or more peer-to-peer transport protocol(s). With respect to CS communication, macro network platform 108 includes CS gateway node(s) 722, which can interface CS traffic received from legacy networks such as telephony network(s) (e.g., public switched telephone network (PSTN), or public land mobile network (PLMN)) or a signaling network (e.g., SS7 network); such networks can be part of external network(s) 736. CS gateway node(s) 722 also can enable exchange of messaging communications in SMS protocol. In addition, CS gateway node(s) 722 can authorize and authenticate traffic (e.g., voice) arising from such networks. Moreover, CS gateway node(s) 722 can access mobility, or roaming, data generated through a SS7 network in response to various mobility events as described herein; for instance, the mobility data can be stored in a VLR (visited location register; not shown). Furthermore, CS gateway node(s) 722 can interface CS-based traffic or signaling with PS gateway node(s) 726. As an example, in a 3GPP UMTS network, CS gateway node(s) 722 can be embodied, at least in part, in gateway GPRS support node(s) (GGSN).

In addition to receiving and processing CS-based traffic and signaling data, PS gateway node(s) 726 can authorize and authenticate PS-based data sessions with wireless equipment (e.g., UE 210) served, in part, through access network 240. Data sessions (e.g., an incoming call) can include traffic exchange with external network(s) 736, which can be interfaced with macro network platform 108 through PS gateway node(s) 726. In an aspect, PS gateway node(s) 726 can generate PDP contexts when a data session is established. For instance, PS gateway node(s) 726 can generate a PDF context that connects UE 210 with a MOTA server that is part of server(s) 730. To at least that end, in an aspect, PS gateway node(s) 726 can include a tunnel interface (e.g., tunnel termination gateway (TTG) in 3GPP UMTS network(s); not shown) which can enable packetized communication with disparate wireless network(s), which can be part of access network(s) 240 and can include Wi-Fi networks, femtocell network(s), macrocell network(s) and associated radio access network(s) (RAN(s)) based on various radio technologies, etc.

Packetized communication can include multiple flows of data that can be generated through server(s) 730, such as management server(s) (e.g., a provisioning server, a MSC) or application server(s). In an aspect, a management server can include a MOTA server that operates in accordance with aspects described herein. It is to be noted that in 3GPP UMTS network(s), PS gateway node(s) 726 (e.g., GGSN) and tunnel interface (e.g., TTG) comprise a packet data gateway (PDG).

Serving node(s) 734 can convey various packetized flows of data streams that can be directed to wireless equipment (e.g., UE 210) served through a macrocell radio access network (RAN); such flows can be received through PS gateway node(s) 726 from server(s) 730. In an aspect, server(s) 730 can receive the communication(s), such as request for data intended to external network(s) 736, which can include an IMS core or other packet-based cores, from wireless equipment (e.g., UE 210) or network elements. As an example, in a 3GPP UMTS network, serving node(s) 734 can be embodied in serving GPRS support node(s) (SGSN). As another example, in a 3GPP LTE network, service node(s) 734 can be embodied in a Mobility Management Entity (MME).

Server(s) 730 can operate in various layers of macro network platform 108 and can execute numerous applications, which can include consumer-oriented application(s), such as messaging services, location services, online gaming, wireless banking, or system-oriented applications, e.g., wireless device management, scheduling or queuing of network traffic, or the like. Such application(s), either consumer-oriented or system-oriented, can generate sets of packetized data streams or flows, and manage (e.g., schedule, queue, format . . . ) such flows. Such application(s), for example can include add-on features to standard services. Data streams generated by server(s) 730 can be conveyed to PS gateway node(s) 726 for authentication/authorization in accordance with various protocols (Kerberos, RADIUS, Diameter, Light Weight Directory Access Protocol (LDAP), etc.) and initiation of a data session and to serving node(s) 734 for communication to wireless equipment (e.g., UE 210) thereafter.

Server(s) 730 also can effect security (e.g., implement one or more firewalls) of macro network platform 108 to ensure network's operation and data integrity in addition to authentication and authorization procedures that CS gateway node(s) 722 and PS gateway node(s) 726 can enact. In addition, server(s) 730 can implement timing protocols (e.g., Network Time Protocol (NTP)) that supply timing framework(s) for various operation(s) of macro network platform 108. Moreover, server(s) 730 can provision services from external network(s) 736 (LAN(s), IMS core network, Global Positioning System (GPS) network(s), or the like). Server(s) 730 can include one or more processors (not shown) configured to provide or that provide, in part, the functionality of macro network platform 108. To that end, the one or more processors can execute one or more sets of computer-executable code instructions (not shown) stored in a memory (not shown) functionally coupled to macro network platform 108, for example.

In example system 700, femto network platform 109 is functionally coupled to external network(s) 736 indirectly, via macro network platform 108. However, in additional or alternative embodiments, femto network platform 109 can be directly connected (e.g., communicatively coupled) to at least one external network in the set of one or more external network(s) 736.

While not illustrated, macro network platform 108 can include a memory or can be functionally coupled to at least one memory. Such memories can retain information related to wireless service provided to wireless equipment (e.g., UE 210) via a RAN. Information stored in the memory (not shown) can be substantially the same or similar in scope to the information retained in memory 716. In certain embodiments, the at least one memory can be a storage layer that contains a group of one or more repositories that retain information that enables, in part, operation of macro network platform 108.

In view of the example system(s) or device(s) described above, example methods that can be implemented in accordance with the disclosed subject matter can be better appreciated with reference to FIGS. 8-12. For purposes of simplicity of explanation, various methods disclosed herein are presented and described as a series of acts; however, it is to be understood and appreciated that the claimed subject matter is not limited by the order of acts, as some acts may occur in different order and/or concurrently with other acts from that shown and described herein. It is noted that not all illustrated acts may be required to implement a described method in accordance with the subject specification. In addition, for example, one or more methods disclosed herein could alternatively be represented as a series of interrelated states or events, such as in a state diagram. Moreover, interaction diagram(s) or call flow(s) represent several of the example methods disclosed herein in accordance with the described subject matter; particularly in instances when disparate entities, or functional elements, enact disparate portions of one or more of the several methods. Furthermore, two or more of the disclosed example methods can be implemented in combination, to accomplish one or more features or advantages described in the subject disclosure.

Methods disclosed throughout the subject specification and annexed drawings are capable of being stored on an article of manufacture (e.g., a removable volatile memory or non-volatile memory) to facilitate transporting and transferring such methods to computers for execution, and thus implementation, by a processor, or for storage in a memory. In an aspect, one or more processors, such as processor(s) that implement the one or more methods described herein, can be employed to execute computer-executable instructions retained in a memory (volatile or non-volatile), or any computer-readable or machine-readable storage medium, to implement one or more of the method described herein. Such computer-executable instructions provide a computer-executable or machine-executable framework to implement the various methods described herein.

Figure 8:
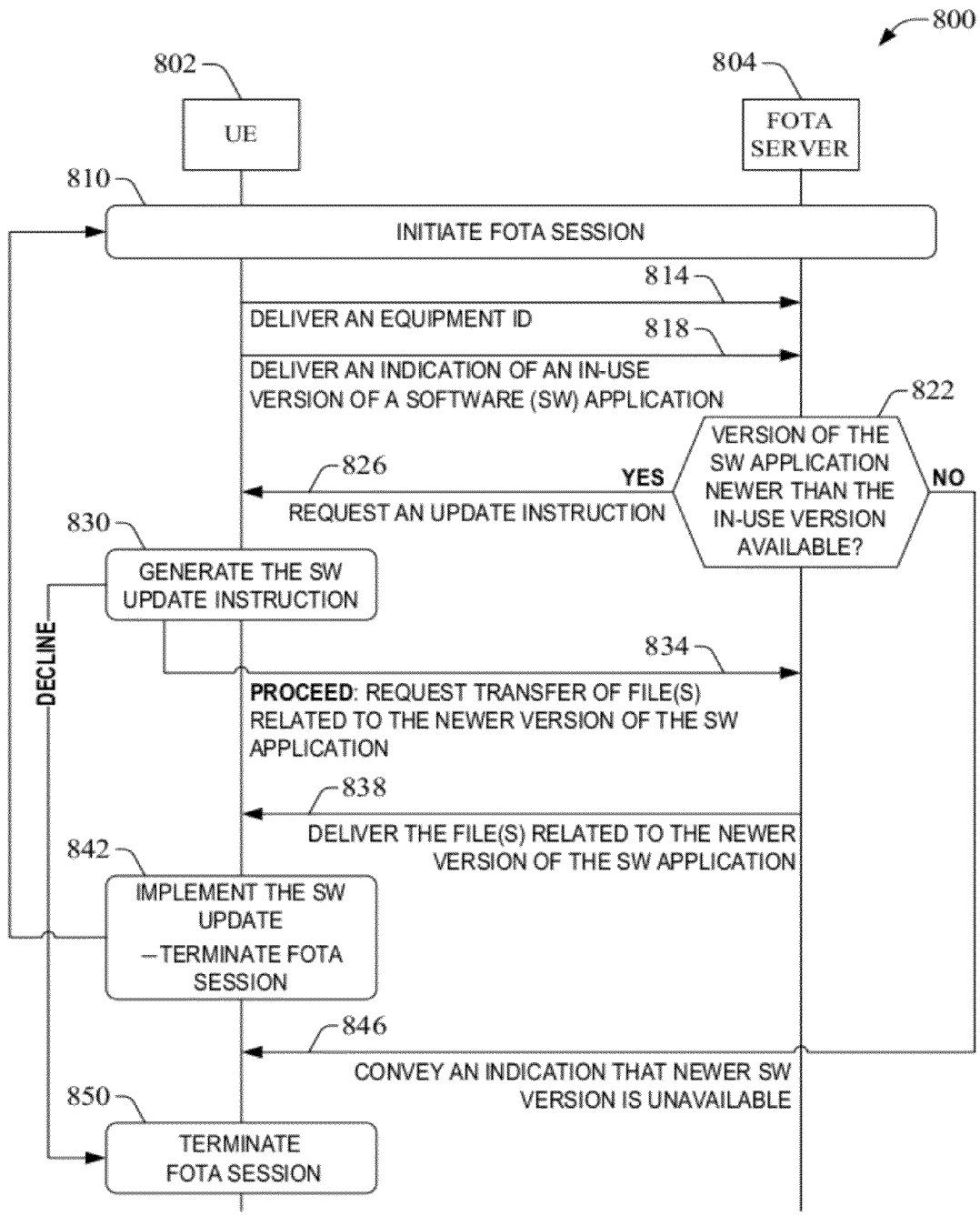
FIG. 8 illustrates an example method for managing software of wireless equipment over-the-air according to an aspect of the subject disclosure.

FIG. 8 represents a call flow of an example method 800 for managing software of wireless equipment over-the-air according to aspects described herein. The managing includes implementing a software application "fix" OTA (FOTA). At act 810, UE 802 initiates a FOTA session. Initiating the FOTA session includes exchanging messages, directly or indirectly, with FOTA server 804. In an aspect, FOTA server 804 can be embodied in one server of MOTA server(s) 254. In response to initiating the FOTA session, at act 814, UE 802 delivers an equipment ID (IMEI, TIA ESN, etc.) that is indicative of an identity of UE 802 and related operational aspects. Additionally, at act 818, UE 802 delivers an indication of, or signaling with associated payload data indicative of, an in-use version of a SW application. As described supra, in alternative or additional embodiments, delivering the equipment ID and the indication of the in-use version of the SW application can be accomplished by delivering a single, consolidated indication (e.g., message) conveying the equipment ID and the indication of the in-use version of the SW application.

FOTA server 804 receives the EID and the in-use version of the SW application and, at act 822, FOTA server 804 determines if a version of the SW application that is newer than the in-use version of the SW application is available. As described supra, determining if such newer version is available can include querying a repository accessible (e.g., functionally coupled) to the FOTA server 804 for a current or last-known version of the SW application available for the EID, and comparing the result with the in-use version of the SW application. The repository can reside within the FOTA server 804 or it can be functionally coupled thereto and resident within a network platform that contains the FOTA server 804. In response to a negative outcome, at act 846, FOTA server 804 conveys an indication that such newer SW version—version of the SW application newer than the in-use version—is unavailable. UE 802 receives (e.g., collects, decodes, collects and decodes . . . ) such indication and terminates the FOTA session at act 850. In contrast, in response to an affirmative outcome of act 822, at act 826, FOTA server 804 can request an update instruction from UE 802. UE 802 receives (e.g., collects, decodes, collects and decodes, . . . ) the request and, at act 830, generates the update instruction. In an illustrative scenario, as described supra, UE 802 can generate the update instruction by collecting data input into UE 802 from an external source (an end-user, disparate equipment, etc.). The collecting can include rendering a user-interface as described supra. In another illustrative scenario, UE 802 can generate the update instruction by analyzing operation condition(s) of the UE 802 and assessing whether a download is feasible (e.g., it can be completed successfully). As described supra, in case the update instruction indicates the update is to be performed, e.g., a "proceed" instruction, UE 802 requests (e.g., delivers a query or a command) at act 834 FOTA server 804 to transfer at least one file related to the newer version of the SW application. At act 838, in response to the request, FOTA server 804 delivers the at least one file related to the newer version of SW application. At act 842, UE 802 implements the update, which includes terminating the FOTA session, and directs flow (or returns logic control) to act 810. In certain embodiments, implementing the SW update can include generating logical reference points (e.g., records in memory or memory pointers) at disparate stages of the implementing in order to resume an SW update that is terminated prior to completion.

Figure 9:
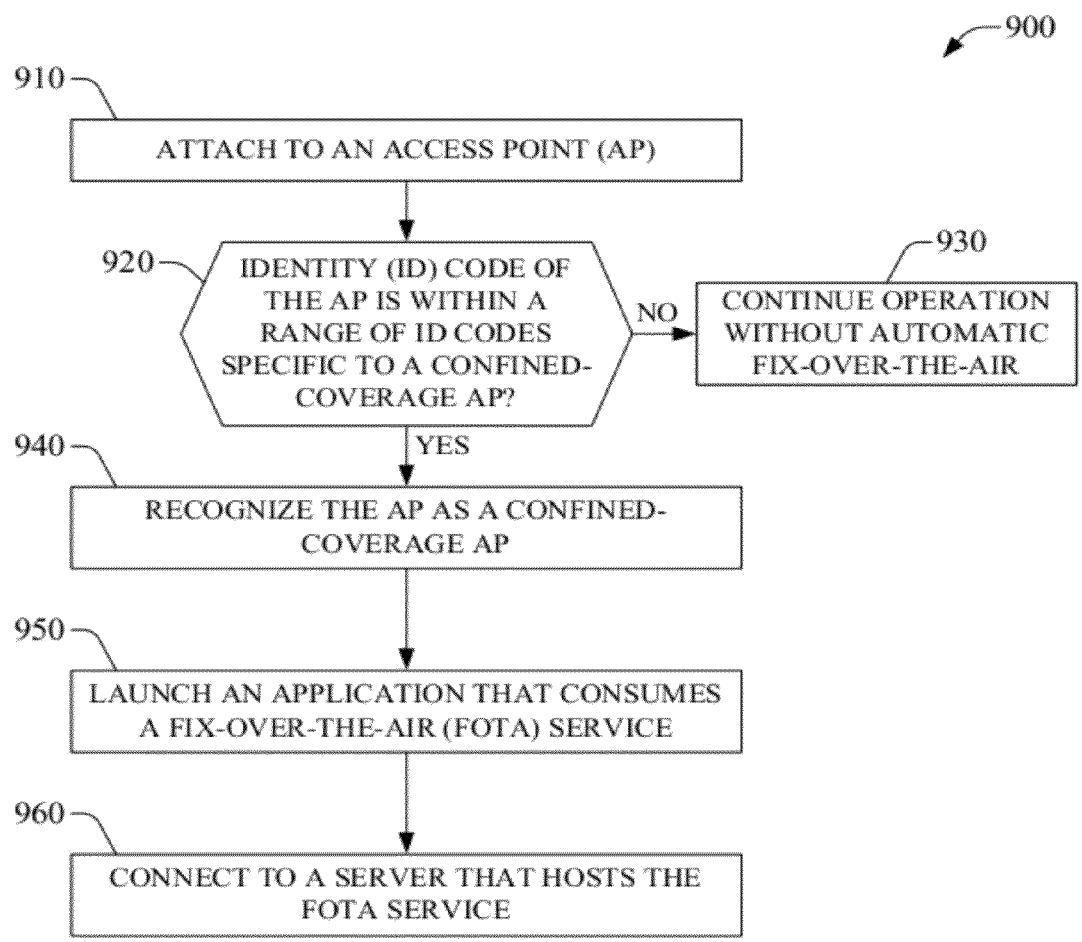
FIG. 9 illustrates an example method for initiating a session for managing SW of wireless equipment (UE, CPE, etc.) according to aspects described herein. In one aspect, the subject example method can be part of the example method illustrated in FIG. 8.
Figure 10:
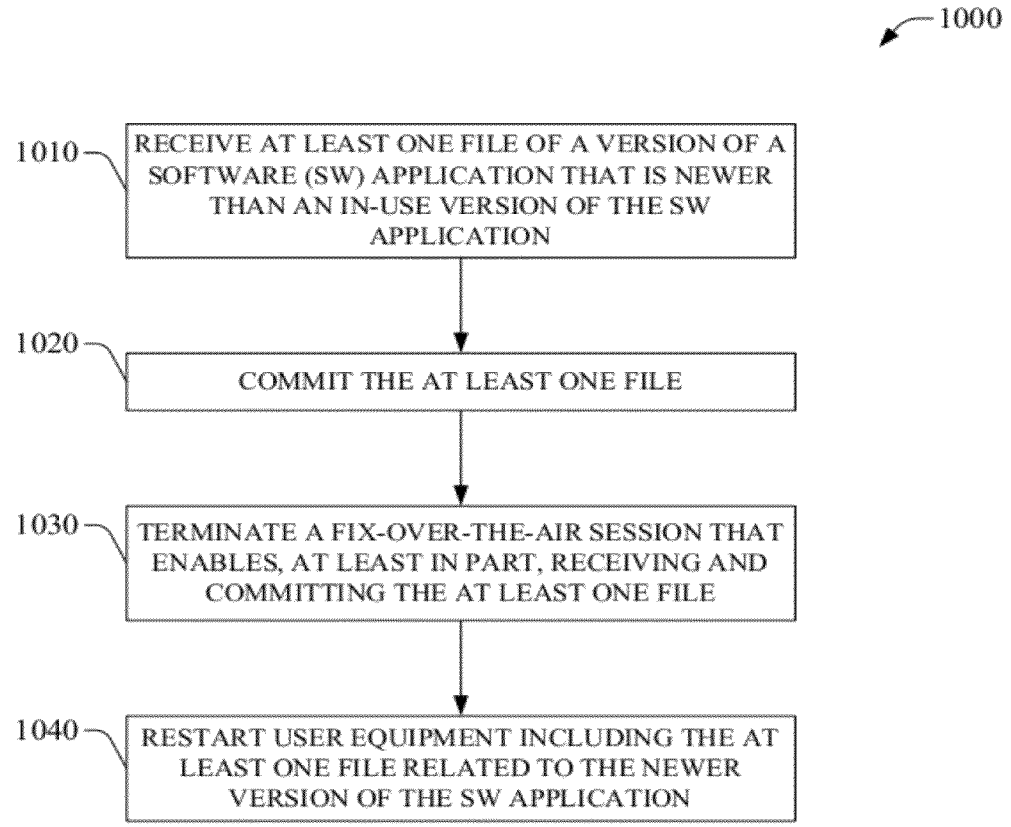
FIG. 10 illustrates an example method for implementing a software update that can be part of managing software of wireless equipment according to aspects described in the subject disclosure. In one aspect, the subject example method can be part of the example method illustrated in FIG. 8.

Examples methods for initiating a FOTA session and implementing a SW update are presented, respectively, in the flowcharts of FIGS. 9-10. Regarding example method 900, attachment to an access point (AP) is effected at act 910. Attachment can be effected according to various approaches (e.g., LAU/RAU in 3GPP UMTS) and can include enacting (e.g., executing) a variety of access control procedures prior to camping in the AP. As described supra, one of such procedures is regulation of attachment through an ACL, wherein the AP exploits the ACL to validate UE that attempts attachment to the AP. In response to attaching to the AP, at act 920, it is determined if an identity (ID) code of the AP is within a range of ID codes specific to a confined-coverage AP. In case the outcome of the determination is negative, operation without automatic FOTA is continued at act 930. In contrast, in case outcome of the determination is affirmative, the AP is recognized as a confined-coverage AP at act 940. Recognizing the AP as a confined-coverage AP (femtocell AP, picocell AP, Wi-Fi AP, etc.) can include configuring a logical variable (e.g., an attachment variable or a presence variable) to a value that conveys attachment to the confined-coverage AP; for instance, the logical variable can be "femto_presence" and it can be set to a "TRUE" value. The recognizing can include configuring and displaying an alphanumeric-tag (A-tag) that discloses that attachment condition of a mobile device (e.g., UE 802) that effects (e.g., executes) the subject example method 900 corresponds to attachment to the confined-coverage AP. As a result of, or in response to, recognizing the AP as a confined-coverage AP, an application that consumes a FOTA service is launched at act 950. At act 960, connection to a server that hosts the FOTA service is effected; the UE that implements the subject example method 900 connects to the server.

In connection to example method 1000, at act 1010, at least one file of a version of the SW application that is newer than an in-use version of the SW application is received (e.g., collected, downloaded, decoded, analyzed, decoded, or combination(s) thereof). In certain embodiments, the receiving includes generating logical reference points (e.g., records in memory or memory pointers) at disparate stages of the implementing in order to resume an SW update that is terminated prior to completion. Moreover, in scenarios in which the receiving occurs as part of resuming a previously incomplete reception of the at least one file, the receiving includes referencing a logical reference point and resuming receiving a remainder of the at least one file.

At act 1020, the at least one file is committed (e.g., stored). In an aspect, committing the at least one file includes storing the at least one file in a memory functionally coupled to the mobile device (e.g., UE 802) that implements the subject example method 1000. In addition, the committing includes processing the at least one file to render the newer version of the newer version of the SW application to be suitable for consumption by the mobile device. In an aspect, the processing can be dictated by the type(s) of the at least one file: For an executable file, the processing can include pointing to a new memory address for execution of the at least one file. For a file that conveys a library, the processing include linking an extant SW application to the library. For a file that includes source code (or computer-executable instructions), the processing can include compiling and linking the file, and generating an executable file there from. Moreover, committing the at least one file can include updating a version data structure (relational table, data tree, file system, etc.) or at least one record thereof, wherein the version data structure maintains a version record of the SW application or SW component(s) related thereto. The version data structure also can maintain record(s) of dependencies of the SW application with disparate SW component(s).

At act 1030, a FOTA session that enables, at least in part, receiving and committing the at least one file is terminated. At act 1040, UE with the newer version of the SW application is restarted, wherein the UE is embodied in the mobile device (e.g., UE 802) that implements (e.g., executes) the subject example method 1000.

Figure 11:
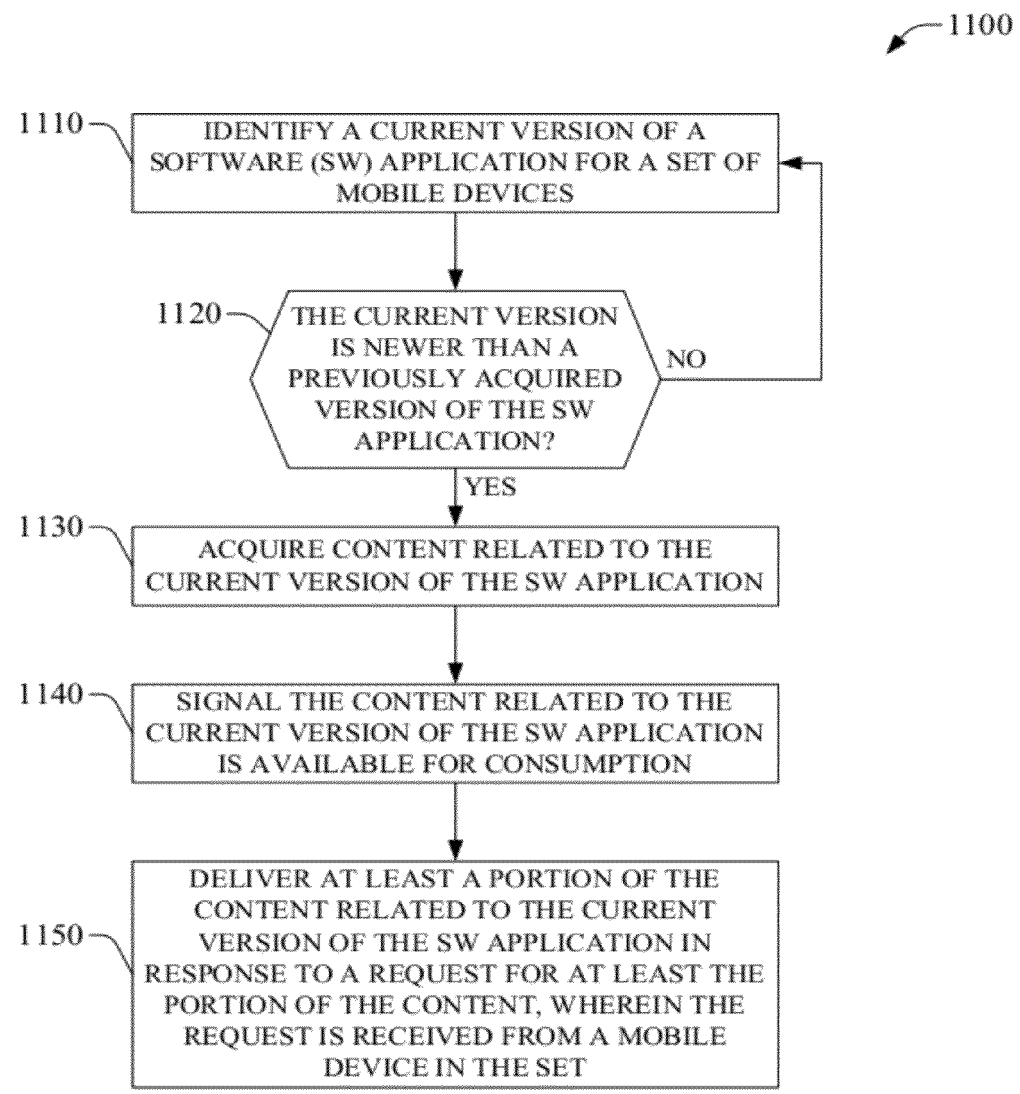
FIG. 11 presents an example method for supplying an updated version of content (e.g., SW application) as part of content management of wireless equipment (UE, CPE, etc.) according to aspects described herein.

FIG. 11 is a flowchart of an example method 1100 for supplying an updated version of a SW application as part of content management of wireless equipment (UE, CPE, etc.) according to aspects described herein. The subject example method can be implemented (e.g., executed) by a confined-coverage AP (femtocell AP, picocell AP, Wi-Fi AP, etc.) functionally coupled to a server, such as MOTA server 254, that enables management of content of wireless equipment. In addition, while illustrated with reference to a mobile device, it should be appreciated that the subject example method can be implemented in connection with any wireless equipment. At act 1110, a current version of a SW application for a set of mobile devices is identified. In an aspect, identifying the current version of the SW application includes querying the server (e.g., MOTA server 254) for data indicative of the latest version of the SW application available in the server, and receiving the data. The querying can be part of a content caching service executed by the confined-coverage AP; the caching service can be embodied in at least one set of computer-executable instruction retained in a memory included within or functionally coupled to the confined-coverage AP. The scope of the set of mobile devices can be determined statically or dynamically, as described supra. For example, the set of mobile devices can include UE included in an ACL of the confined-coverage AP. For another example, the set of mobile devices can rely on subscription data and include UE that is part of a specific subscriber segment (e.g., business subscribers, premium subscribers, etc.). In the alternative, the set of mobile devices can be established dynamically, based at least on historical data related to visitation to the confined-coverage AP that implements the subject example method 1100.

At act 1120 it is determined if the current version is newer than a previously acquired version of the SW application. Effecting such determination can include comparing data indicative of the current version, as received as part of act 1110, with data indicative of the previously acquired version of the SW application. Data indicative of previously acquired version(s) of SW application(s) can be retained within the memory that retains the content caching service. The confined-coverage AP or a component therein (e.g., connectivity manager 614) can record data representative of a version of a SW application that is relayed to wireless equipment as part of managing content of the wireless equipment according to aspects of the subject disclosure. Negative outcome of act 1120 leads to act 1110. In the alternative, affirmative outcome of act 1120 leads to act 1130, in which the current version of the SW application is acquired (e.g., downloaded). The current version can be acquired from the server (e.g., MOTA server 254) that enables management of content of wireless equipment. Acquiring the current version of the SW application includes storing such version in the memory that retains the content caching service.

At act 1140, availability for consumption of content related to the current version of the SW application is signaled. Signaling such availability includes delivering an indication to the foregoing server (e.g., MOTA server 254) that the content can consumed (e.g., retrieved) from the confined-coverage AP that implements the subject example method. In an aspect, as described supra, the indication includes payload data indicative of the current version that is available for consumption, the wireless equipment for which the content is available, and a logical address (e.g., internet protocol (IP) address) of a source (e.g., a memory element, such as application cache 636) that contains the content.

At act 1150, at least the portion of the content related to the current version of the SW application is delivered in response to a request for at least the portion of the content received, wherein the request is received from a mobile device in the set of mobile devices. The content can include one or more of source code, executable code, or one or more of a library, a class, an object, a module, or the like.

In example method 1100, acts 1110 through 1130 or 1140 collectively embody an example method for caching content related to a current version (e.g., an updated version) of a SW application and related SW component(s). The confined-coverage AP that implement example method 1100 can implement caching of such content within a time interval of low traffic served by the confined-coverage AP or low processing load therein; for example, the time interval can be an overnight period or a period of low occupancy of an area (household, enterprise, etc.) served by the confined-coverage AP.

Additionally, example method 1100 allows one-to-many content distribution: The confined-coverage AP that implements example method 1100—one source—can distribute content related to a SW application to a plurality of mobile devices—many recipients. Compared to network-based delivery (see, e.g., FIG. 8) of content related to a SA application and common to two or more mobile devices, delivery of such content to the two or more mobile devices according to example method 1100 can be more efficient and reliable since the content is made available to the two or more mobile devices in a single instance through acts 1110-1130. Increased efficiency and reliability arises at least from mitigation or avoidance of utilization of backhaul network resources for delivery of content related to an SW application to a mobile device. Moreover, more efficient delivery (e.g., faster or less prone to error delivery) can release resources of the confined-coverage AP and mitigate impact of an update on the battery life of the mobile device.

Figure 12:
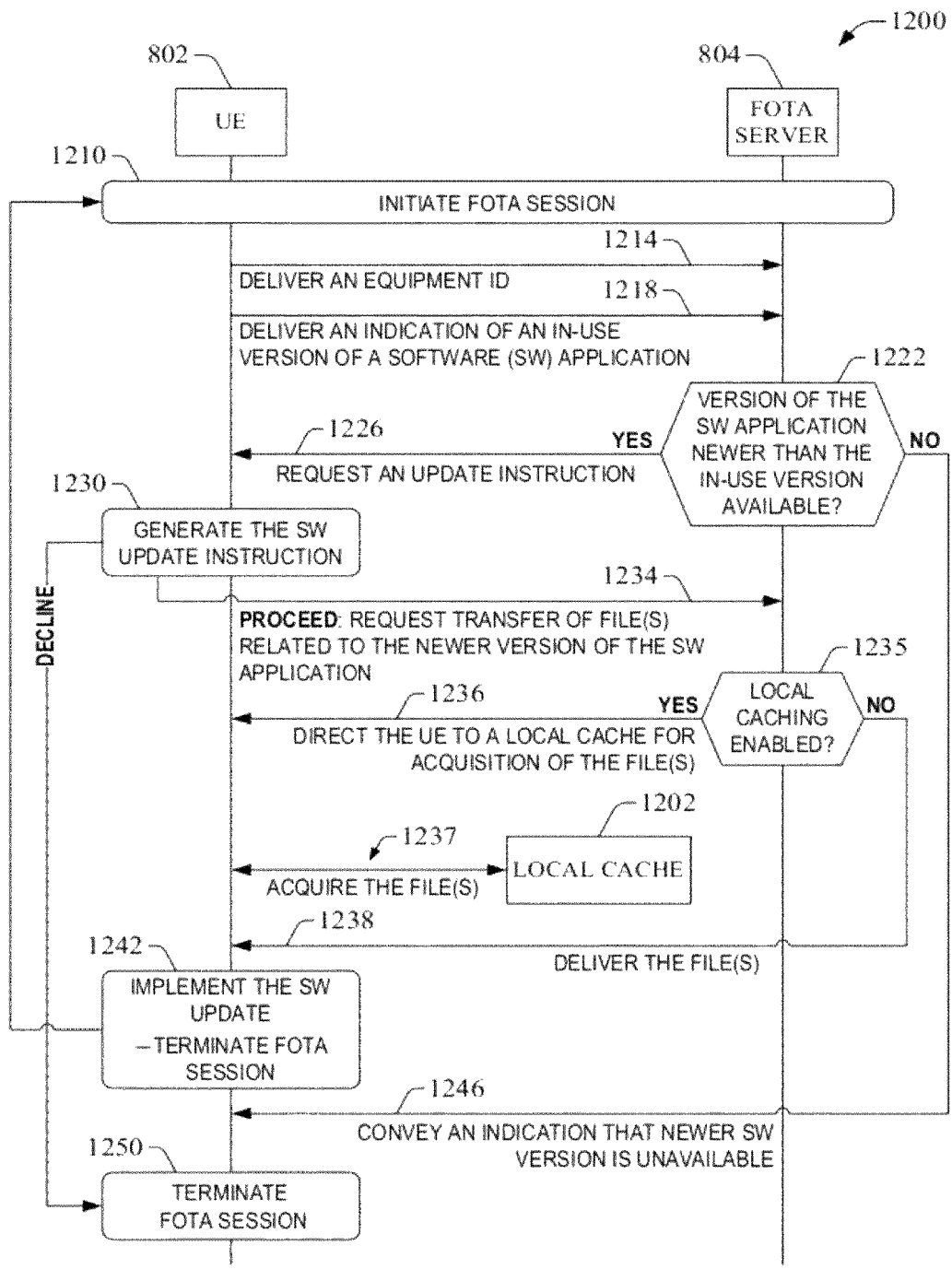
FIG. 12 depicts an example method for managing software of wireless equipment over-the-air according to aspects described herein.

To illustrate utilization of the features related to local caching as described in connection with example method 1100, FIG. 12 depicts a call flow of an example method 1200 for managing software of wireless equipment over-the-air, wherein local caching can be exploited. The subject example method is similar to example method 800, but exploits local caching when enabled. Acts 1210-1234 are substantially the same, respectively, as acts 810-834. At act 1235, FOTA server 804 determines if local caching is enabled. Such determination can be based on reception of an indication, and related payload data, that content related to a SW application is available in a local cache 1202 external to the FOTA server 804. As described hereinbefore, the local cache 1202 can be functionally coupled to a confined-coverage AP or included therein. In a scenario local caching is not enabled, flow is directed to act 1238, which is substantially the same as act 838. In the alternative, when local caching is enabled, at act 1236, FOTA server 804 directs the UE 802 to the local cache 1202 for acquisition of the files. In an aspect, FOTA server 804 conveys data indicative of a logical network address (e.g., IP address) of the local cache 1202. In response to receiving such directive, UE 802 acquires the file(s) related to the newer version of the SW application from local cache 1202 through a set of acts 1237. In certain embodiments, acquiring the files from the local cache 1202 includes downloading the file(s), wherein UE 802 delivers a request for the file(s) to a component (e.g., a confined-coverage AP) that controls access to the local cache 1202. Note that the request delivered by the UE 802 is the request referred to in act 1150. The component receives the request and validates the UE 802 in case the delivery of the request (e.g., a Diameter request) is part of an authentication protocol (e.g., Diameter). In response to classifying the UE 802 as a valid UE, the component delivers the requested file(s) to the UE 802 from the local cache 1202. The subject example method 1200 continues at acts 1242-1250, which are substantially the same to respective acts 842-850.

While examples methods 800-1200 are illustrated in connection with a SW application, the subject example methods can be implemented for SW component(s) related to the SW application or for substantially any or any content that is specific to one or more features of wireless equipment and operation thereof. As indicated supra, the one or more features can be a hardware feature, a software feature, a security feature, an access clearance feature, a location feature, or a combination thereof.

Additionally, example methods 800-1100 or acts thereof can be implemented by one or more processors that are part of wireless equipment, MOTA server, access points, network nodes, and so forth. The one or more processor can be configured to enable or can enable at least part of the functionality to such functional elements. In scenarios in which one or more components that are part of such functional elements are embodied in group(s) of one or more computer-executable instructions stored in at least one memory, at least one processor that executes or is configured to execute the group(s) of one or more computer-executable instructions can implement (e.g., execute) one or more of methods 800-1000 described herein. Such implementation can be the result, at least in part, of execution of the group(s) of one or more computer-executable instructions.

Various advantages emerge from the aspects or features described in the subject disclosure. In general, when compared with conventional systems, such aspects or features enable more aggressive update of software and related functionality of wireless equipment via transport and radio resources provided by subscriber of wireless service consumed through the wireless equipment. More particularly, though not exclusively, illustrative advantages of the subject disclosure include the following. (i) Automatic implementation of management content in response to recognition of a confined-coverage AP that serves the wireless equipment for which content in managed. (ii) Utilization of radio and transport resources provided by a subscriber of wireless service provided, in part, through the confined-coverage AP. (iii) Increased revenue potential and perceived quality of service originated in proactive deployment (download, installation, activation, etc.) of content utilized by the wireless equipment. (iv) One-to-many distribution of content through caching. Compared to distribution of content that is common to multiple wireless equipment and entails repeated distribution from a network-based server (MOTA server 254) to each of the multiple wireless equipment, one-to-many distribution from a single non-network-based cache reduces utilization of backhaul network resources since the content can be made available to each of the multiple wireless equipment in a single event. In addition, for at least a femtocell network, the numerous aspects or features described herein provide superior solution(s) to OTA management of content for wireless equipment by leveraging operational aspects of the femtocell network.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be employed to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

As it is employed in the subject disclosure, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification and annexed drawings, terms such as "store," "data store," "data storage," "database," "repository," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. In addition, memory elements described herein can be affixed, removable, or a combination thereof.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. In addition, various aspects disclosed in the subject specification can also be implemented through code instructions, or program modules, stored in a memory and executed by a processor, or other combination of hardware and software, or hardware and firmware. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disc (CD), digital versatile disc (DVD), blu-ray disc (BD) . . . ), smart cards, and flash memory devices (e.g., card, stick, key drive . . . ).

It should be appreciated that while various aspects, features, or advantages described herein have been illustrated through femtocell access point(s) and associated coverage, such aspects or features also can be exploited in confined-coverage access point(s) that provide wireless coverage through substantially any or any disparate telecommunication technologies, such as for example Wi-Fi (wireless fidelity) or picocell telecommunication. Moreover, aspects, features, or advantages of the subject disclosure can be exploited in substantially any wireless telecommunication, or radio, technology; for example, Wi-Fi, Worldwide Interoperability for Microwave Access (WiMAX), Enhanced General Packet Radio Service (Enhanced GPRS), 3GPP LTE, 3GPP2 UMB, 3GPP UMTS, HSPA, HSDPA, HSUPA, or LTE Advanced. Furthermore, substantially all aspects of the subject disclosure can include legacy telecommunication technologies.

What has been described above includes examples of systems and methods that provide advantages of the subject disclosure. It is, of course, not possible to describe every conceivable combination of components or methodologies for purposes of describing the subject disclosure, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
   determining, by a user equipment comprising a processor, that an access point device to which the user equipment is coupled is a confined-coverage access point device; and
   in response to the determining, initiating, by the user equipment, a communication session that facilitates an over-the-air content download from a data store of the access point device subsequent to the over-the-air content being transmitted from a network server to the data store based on frequency of visitation data associated with the access point device.

2. The method of claim 1, wherein the determining comprises comparing identifier data related to the access point device with range data indicative of a set of codes reserved for confined-coverage access point devices.

3. The method of claim 1, wherein the initiating comprises initiating the communication session based on analyzing an operating condition associated with the user equipment.

4. The method of claim 1, wherein the initiating comprises initiating the communication session based on analyzing a processing resource available to the user equipment.

5. The method of claim 1, wherein the initiating comprises initiating the communication session based on determining telecommunication performance data representing a performance characteristic of the user equipment.

6. The method of claim 5, wherein the determining the telecommunication performance comprises receiving performance indicator data representing a key performance indicator associated with the user equipment.

7. The method of claim 1, wherein the determining comprises configuring a logical variable as a function of a value that represents a coupling of the user equipment to the confined-coverage access point device.

8. The method of claim 1, further comprising:
   as part of the initiating, facilitating, by the user equipment, a transmission of identifier data indicative of the user equipment to the network server.

9. The method of claim 8, further comprising:
   receiving, by the user equipment, the over-the-air content that is selected based on device-to-version mapping data that is determined in accordance with the identifier data.

10. The method of claim 9, wherein receiving comprises receiving the over-the-air content from the data store in response to verifying that local caching has been enabled by the network server.

11. A system, comprising:
    a memory to store instructions; and
    a processor, coupled to the memory, that facilitates execution of the instructions to perform operations, comprising:
       determining that an access point device to which a user equipment is coupled is a confined-coverage access point device; and
       in response to the determining, initiating, by the user equipment, an over-the-air content delivery session that facilitates a transfer of content from a data store of the access point device to the user equipment, wherein prior to the initiating, the content is downloaded to the data store from a network server based on a frequency of visitation data associated with the access point device.

12. The system of claim 11, wherein the frequency of visitation data comprises information that represents a number of attachment attempts made by the user equipment within a specified time period to facilitate a coupling with the access point device.

13. The system of claim 11, wherein the frequency of visitation data is employed to determine classification data indicative of a classification of a set of devices, comprising the user equipment, and wherein the content to be downloaded is selected based on the classification data.

14. The system of claim 11, wherein the operations further comprise:
receiving, from the network server, request data indicative of a request for an authorization to initiate the over-the-air content delivery session.

15. The system of claim 14, wherein the operations further comprise:
in response to the receiving the request, receiving authorization data indicative of the authorization via an input interface of the user equipment.

16. The system of claim 13, wherein the content to be downloaded is further selected based on association data that represents an association between the access point device and the set of devices.

17. The system of claim 11, wherein the determining comprises:
receiving, from a network device, location area code data indicative of a set of respective location area codes assigned to confined-coverage access point devices; and
comparing information indicative of a location area code of the access point device with the location area code data.

18. A tangible computer-readable medium comprising instructions that, in response to execution, cause a system comprising a processor to perform operations, comprising:
in response to verifying that an access point device to which a user equipment is coupled is a confined-coverage access point device, facilitating an establishment of an over-the-air content delivery session between the user equipment and a data store of the access point device; and
as part of the over-the-air content delivery session, facilitating a transfer of content from the data store to the user equipment, wherein the content is downloaded to the data store from a network server based on a frequency of visitation data associated with the access point device.

19. The tangible computer-readable medium of claim 18, wherein the frequency of visitation data is employed to determine classification data indicative of a classification of a set of devices, comprising the user equipment, and wherein the content to be downloaded is selected based on the classification data.

20. The tangible computer-readable medium of claim 18, wherein the content is downloaded to the data store based on association data indicative of an association between the access point device and a set of devices.

* * * * *